(12) United States Patent  
Hegna

(10) Patent No.: US 12,099,155 B2  
(45) Date of Patent: Sep. 24, 2024

(54) ATTENUATION OF AXIAL VIBRATION NOISE IN PRESSURE SENSOR MEASUREMENTS

(71) Applicant: PGS Geophysical AS, Oslo (NO)

(72) Inventor: Stian Hegna, Oslo (NO)

(73) Assignee: PGS Geophysical AS, Oslo (NO)

( * ) Notice: Subject to any disclaimer, the term of this patent is extended or adjusted under 35 U.S.C. 154(b) by 654 days.

(21) Appl. No.: 17/204,854

(22) Filed: Mar. 17, 2021

(65) Prior Publication Data

US 2022/0035060 A1    Feb. 3, 2022

Related U.S. Application Data

(60) Provisional application No. 63/059,838, filed on Jul. 31, 2020.

(51) Int. Cl.
| G01V 1/36 | (2006.01) |
| G01V 1/20 | (2006.01) |
| G01V 1/38 | (2006.01) |

(52) U.S. Cl.
CPC .............. *G01V 1/364* (2013.01); *G01V 1/201* (2013.01); *G01V 1/38* (2013.01); *G01V 2210/32* (2013.01)

(58) Field of Classification Search
CPC .......... G01V 1/364; G01V 1/201; G01V 1/38; G01V 2210/32
See application file for complete search history.

(56) References Cited

U.S. PATENT DOCUMENTS

| 2004/0042341 A1 | 3/2004 | Tenghamn et al. |
| 2004/0145968 A1 | 7/2004 | Brittan et al. |
| 2012/0026829 A1* | 2/2012 | Hegna ................... G01V 1/364 367/21 |
| 2014/0286127 A1* | 9/2014 | Goujon .................. G01V 1/38 367/24 |
| 2014/0288841 A1* | 9/2014 | Ozdemir ................ G01V 1/38 702/17 |
| 2014/0316708 A1 | 10/2014 | Mollineaux et al. |
| 2017/0059731 A1 | 3/2017 | Bjornemo |
| 2017/0097434 A1* | 4/2017 | Peng ........................ G01V 1/32 |
| 2017/0363757 A1* | 12/2017 | Halliday ................ G01V 1/282 |

(Continued)

FOREIGN PATENT DOCUMENTS

| EP | 2073043 A2 | 6/2009 |
| EP | 2420864 A2 | 2/2012 |
| WO | 0016127 A1 | 3/2000 |

(Continued)

OTHER PUBLICATIONS

Search Report in FR2108360 dated Nov. 30, 2022 (15 pages).

(Continued)

*Primary Examiner* — Krystine E Breier

(57) ABSTRACT

Methods and apparatus are described for reducing noise in measurements made by one or more pressure sensors disposed in a cable having a generally longitudinal axis. Estimated axial vibration noise at a location along the cable is determined based at least in part on measurements from one or more motion sensors disposed along the cable. The estimated axial vibration noise is subtracted from pressure sensor measurements corresponding to the location. The result is noise-attenuated pressure sensor measurements corresponding to the location.

31 Claims, 17 Drawing Sheets

(56) References Cited

U.S. PATENT DOCUMENTS

2019/0064379 A1* 2/2019 Leboeuf .................. G01V 1/38

FOREIGN PATENT DOCUMENTS

| WO | 2007149702 | 12/2007 | | |
|---|---|---|---|---|
| WO | 2007149702 A2 | 12/2007 | | |
| WO | WO-2015048494 A1 * | 4/2015 | ............. | G01V 1/201 |

OTHER PUBLICATIONS

Teigen, et al., "Characterization of Noise Modes in Multicomponent (4C) Towed Streamers," SEG Technical Program Expanded Abstracts 2012 (SEG Oct. 25, 2012), 5 pages.
GB Search Report in Application No. GB2110972.3 dated Apr. 7, 2022, 3 pages.

* cited by examiner

ATTENUATION OF AXIAL VIBRATION NOISE IN PRESSURE SENSOR MEASUREMENTS

CROSS-REFERENCE TO RELATED APPLICATIONS

This application claims benefit to the filing date of U.S. Provisional Application 63/059,838, filed Jul. 31, 2020, the contents of which are hereby incorporated by reference as if entirely set forth herein.

BACKGROUND

Marine seismic surveys are performed in bodies of water to determine attributes of structures or materials disposed in volumes of earth underlying the surveys. One common type of marine seismic survey is a towed streamer survey. In a towed streamer survey, a vessel tows one or more elongate cables, usually called streamers, in a pattern over a subsurface area of interest. Each of the streamers includes an array of sensors disposed at intervals along the length of the streamer, such that the streamer forms a sensor array. One or more seismic sources (for example, air guns or marine vibrators) are activated as the streamers are towed. Acoustic energy generated by the source activations penetrates into the underlying earth layers and ultimately is reflected back upward to the sensors. Recording equipment, usually aboard the towing vessel, records signals generated by the sensors in response to the reflected energy. Seismic imaging techniques are applied to the recorded signals to produce images of the subsurface structures that produced the reflections. It is desirable for such images to be accurate.

The sensors used in a towed streamer almost universally include hydrophones. Hydrophones are pressure sensors and are responsive to pressure fluctuations in the water that that surrounds them. To a degree, however, hydrophones are also sensitive to vibration noise within the streamer itself. Such vibration noise has a variety of causes including, for example, towing forces exerted by the vessel, control forces exerted by equipment attached to the streamer, turbulence attributable to barnacle growth along the streamer, and the like.

Because a towed streamer is under tension while it is towed, vibration noises originating in one location on the streamer can propagate along the streamer's length to every other location along the streamer. Accordingly, the seismic signals generated by the hydrophones disposed along a streamer typically include vibration noise, even if such noise does not originate in close proximity to any one of the hydrophones.

Vibration noise in hydrophone outputs is undesirable because it degrades the signal to noise ratio of the seismic signals that are of interest in the survey. This, in turn, can degrade the accuracy of the images that are produced from the recorded hydrophone outputs.

DETAILED DESCRIPTION

This disclosure describes multiple embodiments by way of example and illustration. It is intended that characteristics and features of all described embodiments may be combined in any manner consistent with the teachings, suggestions and objectives contained herein. Thus, phrases such as "in an embodiment," "in one embodiment," and the like, when used to describe embodiments in a particular context, are not intended to limit the described characteristics or features only to the embodiments appearing in that context.

The phrases "based on" or "based at least in part on" refer to one or more inputs that can be used directly or indirectly in making some determination or in performing some computation. Use of those phrases herein is not intended to foreclose using additional or other inputs in making the described determination or in performing the described computation. Rather, determinations or computations so described may be based either solely on the referenced inputs or on those inputs as well as others. The phrase "configured to" as used herein means that the referenced item, when operated, can perform the described function. In this sense an item can be "configured to" perform a function even when the item is not operating and is therefore not currently performing the function. Use of the phrase "configured to" herein does not necessarily mean that the described item has been modified in some way relative to a previous state. "Coupled" as used herein refers to a connection between items. Such a connection can be direct or can be indirect through connections with other intermediate items. Terms used herein such as "including," "comprising," and their variants, mean "including but not limited to." Articles of speech such as "a," "an," and "the" as used herein are intended to serve as singular as well as plural references except where the context clearly indicates otherwise.

Figure 1:
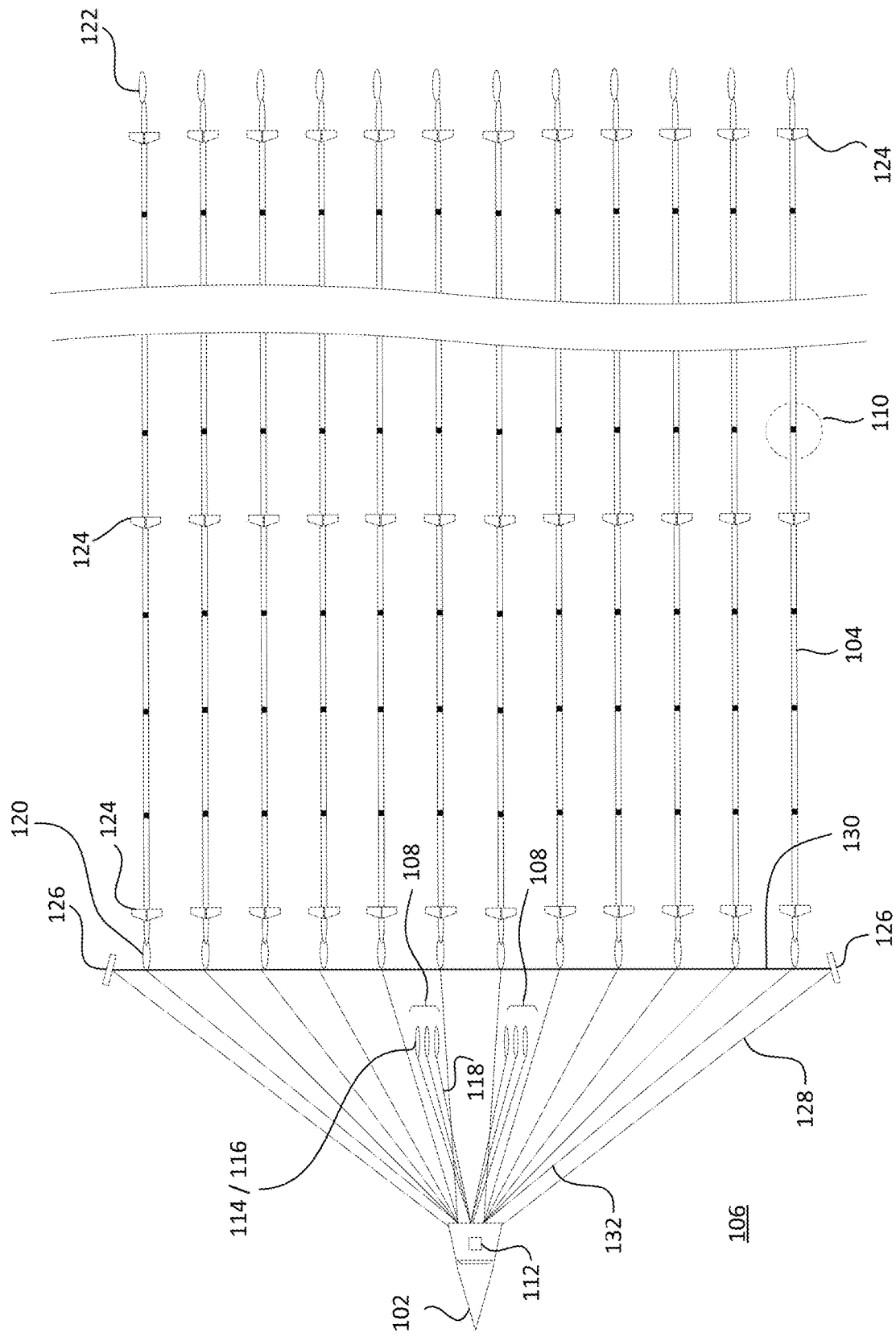
FIG. 1 is an overhead view illustrating a representative towed streamer marine seismic survey system.
Figure 2:
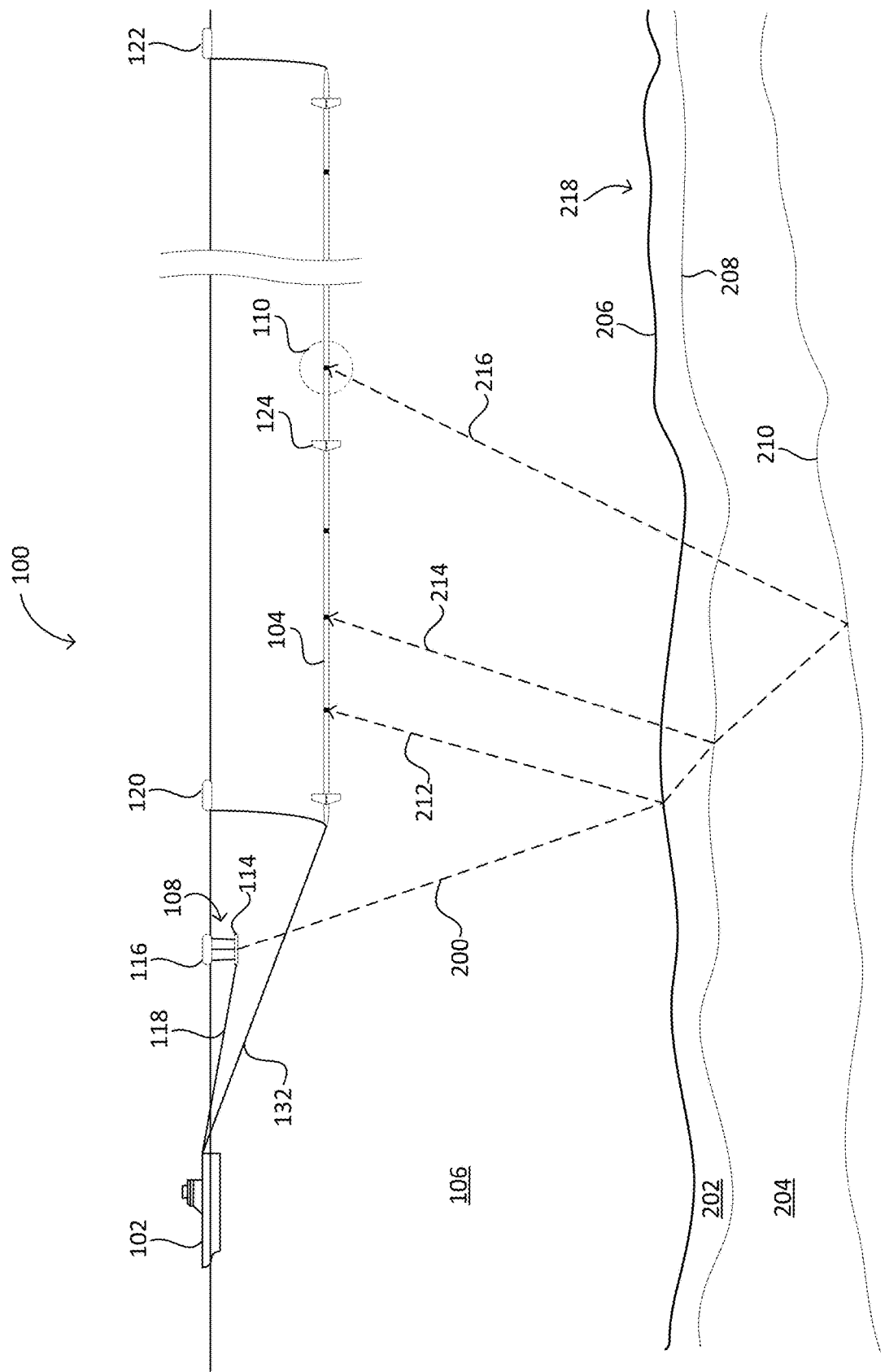
FIG. 2 is a side elevation view of the marine seismic survey system of FIG. 1.

FIGS. 1 and 2 present top and side elevation views, respectively, of an example towed-streamer marine seismic survey system 100. Survey system 100 is representative of a variety of similar geophysical survey systems in which a vessel 102 tows an array of elongate sensor streamers 104 in a body of water 106 such as an ocean, a sea, a bay, or a large lake. Vessel 102 is shown towing twelve streamers 104 in the illustrated example. In other embodiments, any number of streamers may be towed, from as few as one streamer to as many as twenty or more. Embodiments to be described below have useful application in relation to towed-streamer surveys such as that depicted in FIGS. 1 and 2. They may also have useful application in other environments in which similar sensor cables are used and in which the sensor cables are under tension. Therefore, the terms "streamer" and "cable" as used herein should be interpreted to include any type of sensor cable under tension, and the terms "streamer" and "cable" may be used interchangeably below.

During a typical marine seismic survey, one or more seismic sources 108 are activated to produce acoustic energy 200 that propagates in body of water 106. Energy 200 penetrates various layers of sediment and rock 202, 204 underlying body of water 106. As it does so, it encounters interfaces 206, 208, 210 between materials having different physical characteristics, including different acoustic impedances. At each such interface, a portion of energy 200 is reflected upward while another portion of the energy is refracted downward and continues toward the next lower interface, as shown. Reflected energy 212, 214, 216 is detected by sensors 110 disposed at intervals along the lengths of streamers 104. In FIGS. 1 and 2, sensors 110 are indicated as black squares inside each of streamers 104. Sensors 110 produce signals corresponding to the reflected energy. These signals are collected and recorded by control equipment 112 located onboard vessel 102. The recorded signals may be processed and analyzed onboard vessel 102 and/or at one or more onshore data centers to produce images of structures within subsurface 218. These images can be useful, for example, in identifying possible locations of hydrocarbon reservoirs within subsurface 218.

Any number of sources 108 may be used in a marine seismic survey. In the illustrated example, vessel 102 is shown towing two such sources. In other systems, different numbers of sources may be used, and the sources may be towed by other vessels, which vessels may or may not tow additional streamer arrays. Typically, a source 108 includes one or more source subarrays 114, and each subarray 114 includes one or more acoustic emitters such as air guns or marine vibrators. Each subarray 114 may be suspended at a desired depth from a subarray float 116. Compressed air as well as electrical power and control signals may be communicated to each subarray via source umbilical cables 118. Data may be collected, also via source umbilical cables 118, from various sensors located on subarrays 114 and/or floats 116, such as acoustic transceivers and global positioning system ("GPS") units. Acoustic transceivers and GPS units so disposed help to accurately determine the positions of each subarray 114 during a survey. In some cases, subarrays 114 may be equipped with steering devices to better control their positions during the survey.

Streamers 104 are often very long, on the order of 5 to 10 kilometers, so usually are constructed by coupling numerous shorter streamer sections together. Each streamer 104 may be attached to a dilt float 120 at its proximal end (the end nearest vessel 102) and to a tail buoy 122 at its distal end (the end farthest from vessel 102). Dilt floats 120 and tail buoys 122 may be equipped with GPS units as well, to help determine the positions of each streamer 104 relative to an absolute frame of reference such as the earth. Each streamer 104 may in turn be equipped with acoustic transceivers and/or compass units to help determine their positions between GPS units and/or relative to one another. In many survey systems 100, streamers 104 include steering devices 124 attached at intervals, such as every 300 meters. Steering devices 124 typically provide one or more control surfaces to enable moving the streamer to a desired depth, or to a desired lateral position, or both. Paravanes 126 are shown coupled to vessel 102 via tow ropes 128. As the vessel tows the equipment, paravanes 126 provide opposing lateral forces that straighten a spreader rope 130, to which each of streamers 104 is attached at its proximal end. Spreader rope 130 helps to establish a desired crossline spacing between the proximal ends of the streamers. Power, control, and data communication pathways are housed within lead-in cables 132, which couple the sensors and control devices in each of streamers 104 to the control equipment 112 onboard vessel 102.

Collectively, the array of streamers 104 forms a sensor surface at which acoustic energy is received for recording by control equipment 112. In many instances, it is desirable for the streamers to be maintained in a straight and parallel configuration to provide a sensor surface that is generally flat, horizontal, and uniform. In other instances, an inclined and/or fan shaped receiving surface may be desired and may be implemented using control devices on the streamers such as those just described. Other array geometries may be implemented as well. Prevailing conditions in body of water 106 may cause the depths and lateral positions of streamers 104 to vary at times, of course. In various embodiments, streamers 104 need not all have the same length and need not all be towed at the same depth or with the same depth profile.

Sensors 110 within each streamer 104 may include one or more different sensor types such as pressure sensors (e.g., hydrophones) and/or motion sensors. Examples of motion sensors include velocity sensors (e.g., geophones) and acceleration sensors (e.g., accelerometers) such as micro-electromechanical system ("MEMS") devices. In general, pressure sensors provide a magnitude-only, or scalar, measurement. This is because pressure is not associated with a direction and is, therefore, a scalar quantity. Motion sensors such as velocity sensors and acceleration sensors, however, each provide a vector measurement that includes both a magnitude and, at least implicitly, a direction, as velocity and acceleration are both vector quantities. Velocity sensors and acceleration sensors each may be referred to herein as "motion sensors."

It is often the case in marine seismic surveys that vibration noise of various origins can propagate down the length of a sensor cable under tension, such as a towed streamer 104. Vibration noise is generally undesirable in a seismic survey because it can degrade the ratio of signal to noise in sensor measurements recorded from the streamer. Most vibration noise in a streamer includes at least one component that is oriented along the longitudinal axis of the streamer. This latter type of noise is referred to herein as "axial vibration noise."

Axial vibration noise in a streamer or cable can be particularly challenging in seismic applications that use pressure sensors (e.g., hydrophones). This is true for several reasons. First, pressure sensors may pick up the noise because the axial vibrations cause pressure fluctuations within the body of the streamer or cable, and pressure sensors are sensitive to these pressure fluctuations. Second, amplitude decay in the vibration tends to be very small as the energy propagates axially. Therefore, noise related to axial vibrations may be observed across the entire length of a streamer or cable. Third, the propagation velocity of axial vibration noise along the streamer or cable is typically close to the propagation velocity of sound in water. Thus, it may be difficult to filter out axial vibration noise from pressure sensor measurements directly, without adversely affecting acoustic signals of interest that are also present in the measurements.

Embodiments disclosed herein beneficially address such problems so that axial vibration noise in pressure sensor measurements may be attenuated while reducing adverse effects on acoustic signals of interest. The embodiments discussed make use of information gathered from one or more motion sensors in the streamer or cable, where the motion sensors directly or indirectly provide at least one component of measurement that is oriented in the direction of the longitudinal axis of the streamer or cable. In a streamer or cable so equipped, the motion sensors can provide direct or indirect measurement of axial vibration noise in the streamer. If the motion sensors also provide components of measurement that are orthogonal to the longitudinal axis of the streamer or cable, then the motion sensors may additionally be used to measure particle motion in the water layer that surrounds the streamer.

Figure 3:
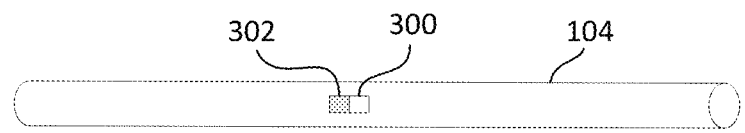
FIG. 3 is a schematic view illustrating a motion sensor collocated with a pressure sensor inside a streamer in accordance with embodiments.
Figure 4:
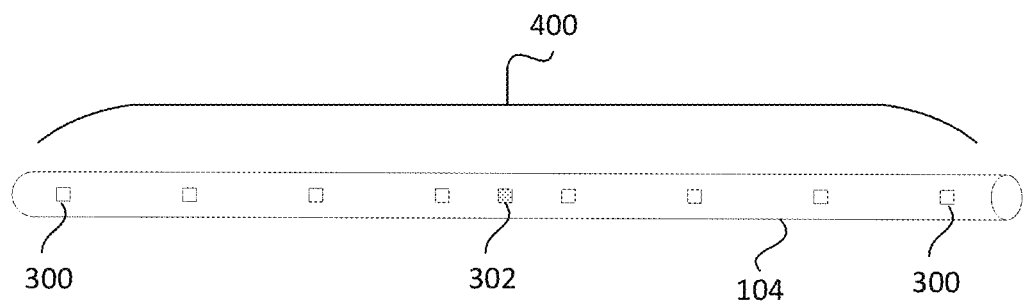
FIG. 4 is a schematic view illustrating a motion sensor collocated with a group of pressure sensors inside a streamer in accordance with embodiments.

FIGS. 3 and 4 illustrate two example arrangements consistent with embodiments for disposing sensors 110 in a streamer or cable 104. In both illustrations, pressure sensors are indicated with white squares, while motion sensors are indicated with shaded squares. In the arrangement of FIG. 3, a pressure sensor 300 is collocated with a motion sensor 302 inside a streamer 104. In the arrangement of FIG. 4, a set of pressure sensors 300 forms a single pressure sensor group 400 inside a streamer 104. A motion sensor 302 is disposed substantially at the center of pressure sensor group 400. Typically, the signals generated by sensors forming a sensor group are combined or aggregated in some way, such as by summation and/or averaging. Such combination or aggregation may be accomplished in any suitable manner, such as in an analog domain using appropriate electrical coupling, or in a digital domain using digital data processing. In general, a sensor group may include any number of sensors and may comprise either pressure sensors or motion sensors. Normally, however, only measurements of the same type in a group (e.g., pressure, velocity, or acceleration) would be subject to combination or aggregation. Thus, in the arrangement of FIG. 4, the measurements of pressure sensors 300 may be combined or aggregated into a single signal, while the measurements of motion sensor 302 would be preserved as a separate signal. Both measurements may correspond to the location of the motion sensor 302.

It should be noted that the arrangements illustrated in FIGS. 3 and 4 are provided by way of example and not by way of limitation. In other embodiments, motion sensors may be disposed at different locations along the streamer or cable 104 and need not necessarily be collocated with, or otherwise physically associated with, the locations of the pressure sensors in the cable 104. For example, motion sensors 302 may be located in electronics modules that are disposed between streamer sections, while the pressure sensors may be located within in the cable sections. In general, motion sensors 302 may be located anywhere along cable 104, and the axial vibrations measured by the motion sensors may be interpolated to the locations of the pressure sensors where vibration noise is to be estimated.

Embodiments to be described below use axial motion sensor measurements to estimate axial vibration noise in pressure sensor measurements. In order to obtain a measurement of axial motion in a streamer or cable 104 directly, a motion sensor 302 would need to be oriented such that one of its axes is pointing along or parallel to the longitudinal axis or the streamer or cable. Thus, in some embodiments, a motion sensor (e.g., a geophone or a single or multi-axis accelerometer) can be oriented within streamer or cable 104 so that one of its axes is substantially parallel to or aligned with the longitudinal axis of the streamer or cable. In such embodiments, axial motion measurements can be obtained from the motion sensors directly. It often occurs, however, that manufacturing techniques used to produce streamers or cables result in misalignments between the axes of motion sensors and the longitudinal axis of the streamer or cable in which the motion sensors are mounted. A technique will now be described that can be employed with measurements from the latter types of streamers or cables as well, such that axial motion measurements can be obtained from the motion sensor measurements indirectly. Persons having skill in the art and having reference to this disclosure will appreciate that, in general, techniques described herein may be employed with measurements from any motion sensor that provides axial information either directly or indirectly.

Figure 5:
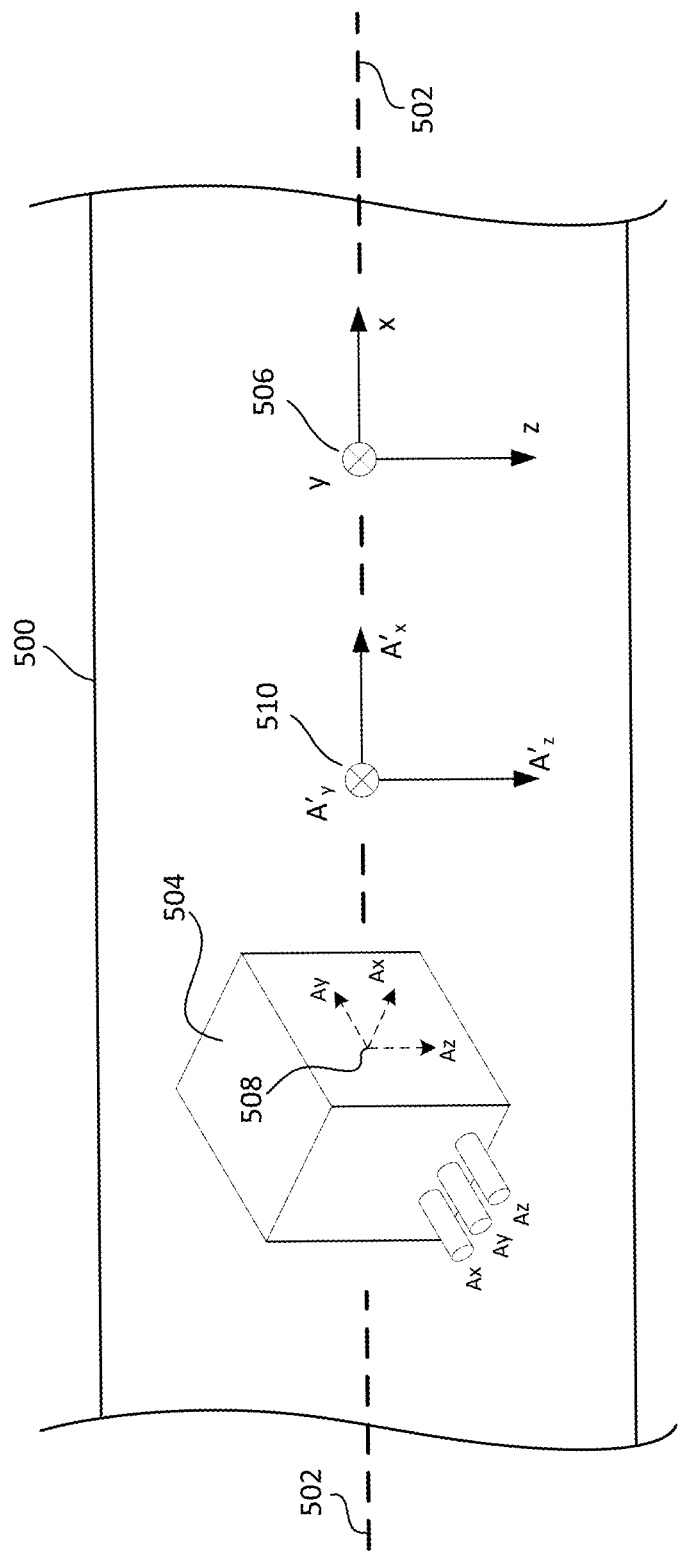
FIG. 5 is a schematic view illustrating a three-axis motion sensor inside a streamer in accordance with embodiments.

FIG. 5 is a close-up view schematically illustrating one example species of motion sensor that may be employed in embodiments such as any of those previously described. FIG. 5 shows a portion of a streamer or cable 500. Streamer or cable 500 has a generally longitudinal axis 502 and defines a frame of reference denoted by mutually orthogonal streamer coordinate axes X, Y, Z indicated at 506. The X axis is aligned with longitudinal axis 502. The Y axis points into the page and is orthogonal to the X and the Z axes. The Z axis points downward and is orthogonal to the X and the Y axes. The Y and Z axes thus lie within a YZ plane that is orthogonal to the longitudinal axis 502 of streamer or cable 500. A motion sensor 504 (in this case an accelerometer) is shown mounted inside streamer or cable 500. The mounting may be accomplished using any suitable technique, such as by mounting the sensor within a spacer element that spans an inner diameter of streamer or cable 500, or by fixing the sensor inside a solid filler material disposed inside streamer or cable 500. Other mounting techniques may also be employed. As was explained above, motion sensor 504 may in general be located anywhere along streamer or cable 500.

In the illustrated embodiment, motion sensor 504 is a three-axis MEMS accelerometer. Techniques described in relation to this accelerometer, however, may be applied in embodiments that include any type of multi-axis motion sensor. Accelerometer 504 provides three mutually orthogonal components of measurement $A_x$, $A_y$, $A_z$ as shown, each representing a vector measurement along a corresponding one of accelerometer coordinate axes $A_x$, $A_y$, $A_z$ indicated at 508. Because accelerometer 504 provides three orthogonal components of measurement, it will provide axial acceleration information (information about acceleration along axis 502) regardless of its orientation within streamer or cable 500. This axial acceleration information may be used according to techniques to be described below for reducing axial vibration noise present in pressure sensor measurements. Accelerometer 504 will also provide orthogonal acceleration information (information about acceleration orthogonal to axis 502) regardless of its orientation within streamer or cable 500. The orthogonal acceleration information may be used to measure particle acceleration in the water layer that surrounds the streamer or cable.

As can be seen in the illustration, none of the axes $A_x$, $A_y$, $A_z$ of accelerometer 504 is physically aligned with a corresponding one of streamer coordinate axes X, Y or Z. It is known, however, that a clockwise rotation about one axis of a Cartesian coordinate system x, y, z can be performed using one of the following three rotation matrices:

$$R(\theta_x) = \begin{bmatrix} 1 & 0 & 0 \\ 0 & \cos\theta_x & -\sin\theta_x \\ 0 & \sin\theta_x & \cos\theta_x \end{bmatrix} \quad (1)$$

$$R(\theta_y) = \begin{bmatrix} \cos\theta_y & 0 & \sin\theta_y \\ 0 & 1 & 0 \\ -\sin\theta_y & 0 & \cos\theta_y \end{bmatrix} \quad (2)$$

$$R(\theta_z) = \begin{bmatrix} \cos\theta_z & -\sin\theta_z & 0 \\ \sin\theta_z & \cos\theta_z & 0 \\ 0 & 0 & 1 \end{bmatrix} \quad (3)$$

where $\theta_x$ denotes a rotation angle about the x axis, $\theta_y$ denotes a rotation about the y axis, and $\theta_z$ denotes a rotation about the z axis. Therefore, if it is desired that the measurements taken from accelerometer 504 should align with streamer coordinate axes 506, and if the degree of misalignment of accelerometer 504 relative to streamer coordinate system X, Y, Z is known, then one or more rotation transformations may be applied to the physical measurements $A_x$, $A_y$, $A_z$ to produce transformed measurements $A'_x$, $A'_y$, $A'_z$ that are aligned with streamer coordinate axes 506, as indicated by transformed accelerometer coordinate axes 510.

Figure 6:
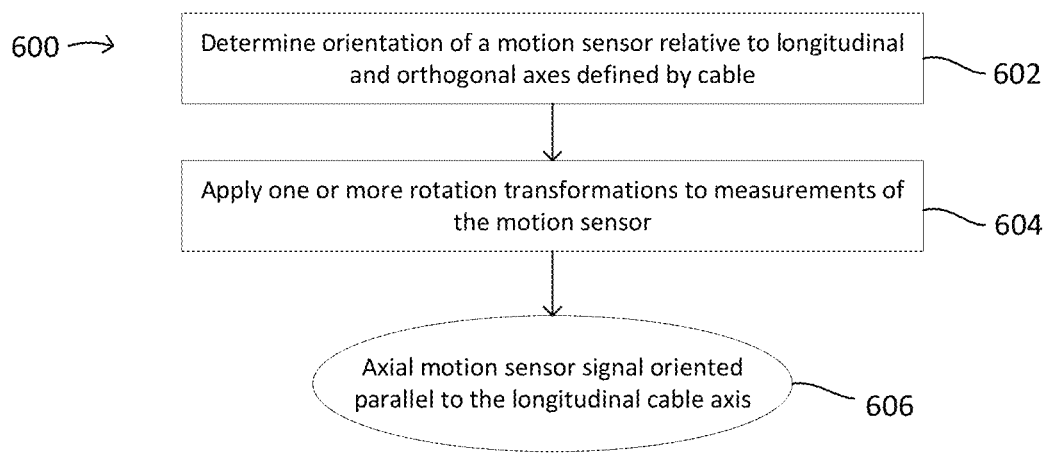
FIG. 6 is a flow diagram illustrating a method, according to embodiments, for generating axial motion sensor signals from multi-axis motion sensor measurements.

FIG. 6 illustrates a method 600 for doing so. In step 602, the orientation of a motion sensor 504 is determined relative to longitudinal (X, 502) and orthogonal (Y and/or Z) axes defined by a cable 500. In step 604, one or more rotation transformations are applied to measurements ($A_x$, $A_y$, $A_z$) recorded from the motion sensor 504. The one or more rotation transformations produce an axial motion sensor signal $A'_x$ that is oriented parallel to the longitudinal axis (X, 502) of the cable 500.

Using the orientation determined in step 602, the one or more rotation transformations referred to in step 604 may be performed by transforming measurements $A_x$, $A_y$, $A_z$ based on equations 1, 2 and 3 as follows:

$$A'_x(t) = A_x(t)\cos\theta_y \cos\theta_z - A_y(t)\sin\theta_z + A_z(t)\sin\theta_y \quad (4)$$

$$A'_y(t) = A_x(t)\sin\theta_z + A_y(t)\cos\theta_z \quad (5)$$

$$A'_z(t) = A_z(t)\cos\theta_y - A_x(t)\sin\theta_y \quad (6)$$

where t is time, $A_x$, $A_y$, and $A_z$ are measurements taken from three-axis accelerometer 504, and $A'_x$, $A'_y$ and $A'_z$ are the measured accelerations after rotation, such that $A'_x$ is oriented along streamer axis 502, while $A'_y$ and $A'_z$ are oriented in or are parallel to a YZ plane orthogonal to streamer axis 502. Since $A'_x$ is oriented along streamer axis 502, it contains acceleration information associated with axial vibrations in the streamer. $A'_y$ and $A'_z$ contain acceleration information associated with transverse vibrations in the streamer. The rotation angles $\theta_y$ and $\theta_z$ correspond to the orientation of the motion sensor referred to in step 602. Although different for each motion sensor in the cable, they are constant numbers for each sensor. This is because a three-axis motion sensor such as an accelerometer is mounted in a specific orientation in the streamer, and this orientation is not likely to change unless there is physical damage of the streamer. Thus, each motion sensor mounted in a streamer or cable may exhibit different rotation angles $\theta_y$ and $\theta_z$, and method 600 may be performed separately for each motion sensor 504 in streamer or cable 500.

Regarding the orientation of the motion sensors determined in step 602, it is possible that the orientation angles for each sensor may be determined during the manufacture or calibration of streamer 500. If, however, the orientation angles of the sensors are not known in advance with sufficient accuracy, then they can be estimated from the three-axis measurements themselves taken during a survey. Since axial and transverse vibrations in a streamer are orthogonal to each other and propagate with very different velocities along the streamer, such vibrations are uncorrelated. Therefore, the orientation angles $\theta_y$ and $\theta_z$ for a given sensor can be found by searching for angles where the cross-correlations between $A'_x$ and $A'_y$, and between $A'_x$ and $A'_z$, are minimum for measurements taken from that sensor.

Figure 7:
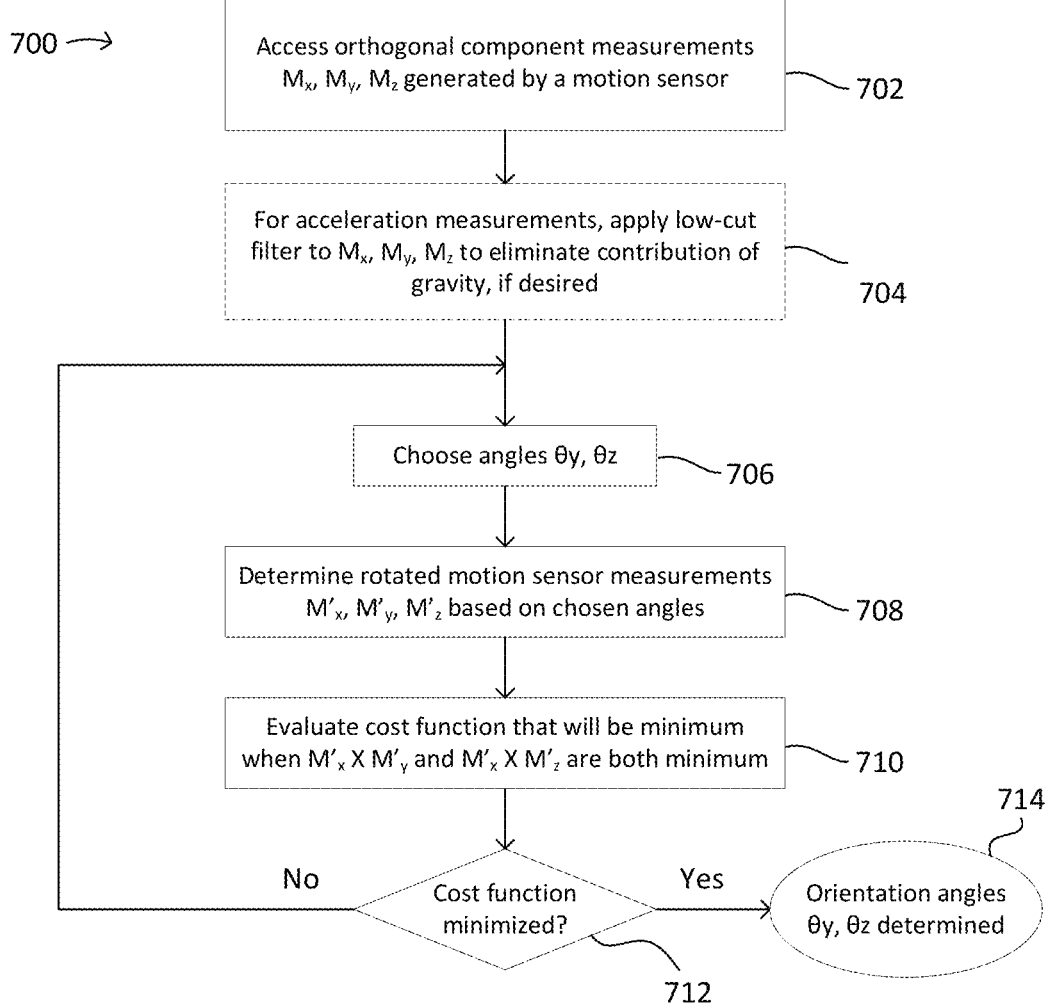
FIG. 7 is a flow diagram illustrating a method, according to embodiments, for determining the motion sensor orientation referred to in FIG. 6.

FIG. 7 illustrates a method 700 for doing so. In step 702, orthogonal component measurements $M_x$, $M_y$, $M_z$ recorded from a motion sensor 504 are accessed. If motion sensor 504 is an accelerometer, and if it is desired to remove the effect of gravitational acceleration from the measurements in order to improve accuracy, then in step 704 a low-cut frequency filter may be applied to the signals $M_x$, $M_y$, $M_z$ (in this case $A_x$, $A_y$, $A_z$) before proceeding. Otherwise step 704 may be omitted. In step 706, initial angles $\theta_y$, $\theta_z$ are chosen, representing a possible orientation of motion sensor 504 relative to the longitudinal axis (X, 502) and the orthogonal axes (Y, Z) of cable 500. θy and θz represent rotations of motion sensor 504 about the Y and Z axes, respectively, that would be necessary to cause axis $A_x$ of motion sensor 504 to align with, or to be parallel with, the longitudinal axis (X, 502) of the cable 500. In general, steps 706-712 have the effect of determining the angles θy, θz based on the measurements $M_x$, $M_y$, $M_z$ of motion sensor 504 themselves. They do so by performing an optimization procedure that finds the two angles by minimizing both the cross correlation between rotated versions of $M_x$, $M_y$ and the cross correlation between rotated versions of $M_x$, $M_z$. The rotated versions of $M_x$, $M_y$, $M_z$ are computed in step 708 using the angles θy, θz chosen in step 706, and can be denoted $M'_x$, $M'_y$, $M'_z$, or, in the case of an accelerometer, $A'_x$, $A'_y$, $A'_z$.

An example method for determining whether the angles θy, θz have been correctly chosen is to evaluate a cost function that will be minimum when the above-described cross correlations are both minimum, as indicated in step 710. (In the illustrated flow diagram, "X" denotes a cross correlation.) The decision in step 712 of the flow diagram indicates that steps 706-710 can be repeated until the optimal angles have been determined. When it is determined in step 712 that the cost function of step 710 is at a minimum, then the optimization procedure terminates, and the angles θy, θz corresponding to the minimum are chosen as the angles that indicate the orientation of motion sensor 504 within streamer or cable 500, as indicated at 714. A suitable cost function for use in step 710 is the following:

$$\underset{argmin}{\left[ \begin{array}{c} \max \left| \begin{array}{c} (A_x(t)\cos\theta_y\cos\theta_z - A_y(t)\sin\theta_z + A_z(t)\sin\theta_y) \times \\ (A_x(t)\sin\theta_z + A_y(t)\cos\theta_z) \end{array} \right|^2 \\ + \\ \max \left| \begin{array}{c} (A_x(t)\cos\theta_y\cos\theta_z - A_y(t)\sin\theta_z + A_z(t)\sin\theta_y) \times \\ (A_z(t)\cos\theta_y - A_x(t)\sin\theta_y) \end{array} \right|^2 \end{array} \right]} \quad (7)$$

where X denotes a cross-correlation, and where $\theta_y$ and $\theta_z$ are unknowns.

After the orientation angles of the three-axis motion sensors within the streamer are known and the vector rotations about the Y and the Z axes have been performed such that the $M'_x$ component measurement is oriented along or is parallel to streamer axis 502, axial vibration noise in pressure measurements at the location of sensor 504 can be estimated from the $M'_x$ values. By subtracting this estimated axial vibration noise from the signals recorded by pressure sensors associated with the same location, noise attenuated pressure sensor measurements may be produced.

Figure 8:
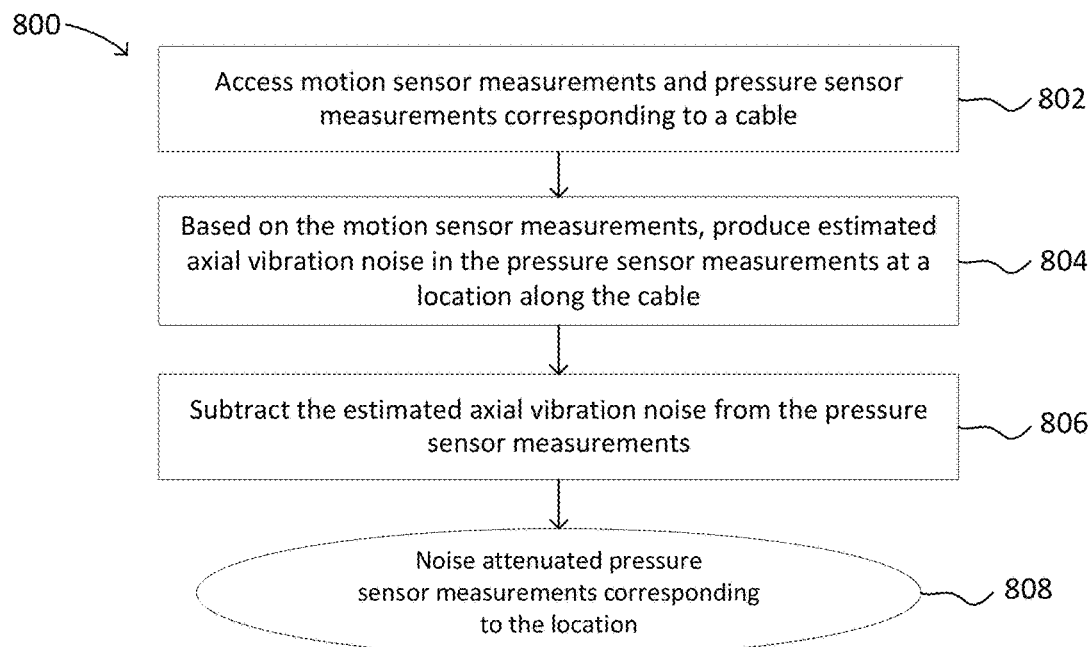
FIG. 8 is a flow diagram illustrating a method for generating noise-attenuated pressure sensor measurements, in accordance with embodiments.

FIG. 8 illustrates a method 800 for generating such noise attenuated pressure sensor measurements. In step 802, recorded motions sensor measurements and pressure sensor measurements corresponding to a streamer or cable are accessed. In step 804, an estimation of axial vibration noise in pressure sensor measurements at a location along the cable is produced based on the recorded motion sensor measurements. In step 806, the estimated axial vibration noise is subtracted from pressure sensor measurements corresponding to the location. The result is pressure sensor measurements corresponding to the location that exhibit attenuated axial vibration noise, as indicated at 808. In general, method 800 may be performed for each of the positions along the cable at which it is desired to estimate axial vibration noise in pressure sensor measurements. For example, method 800 may be performed for each position along the cable at which a pressure sensor or pressure sensor group is located.

Figure 9:
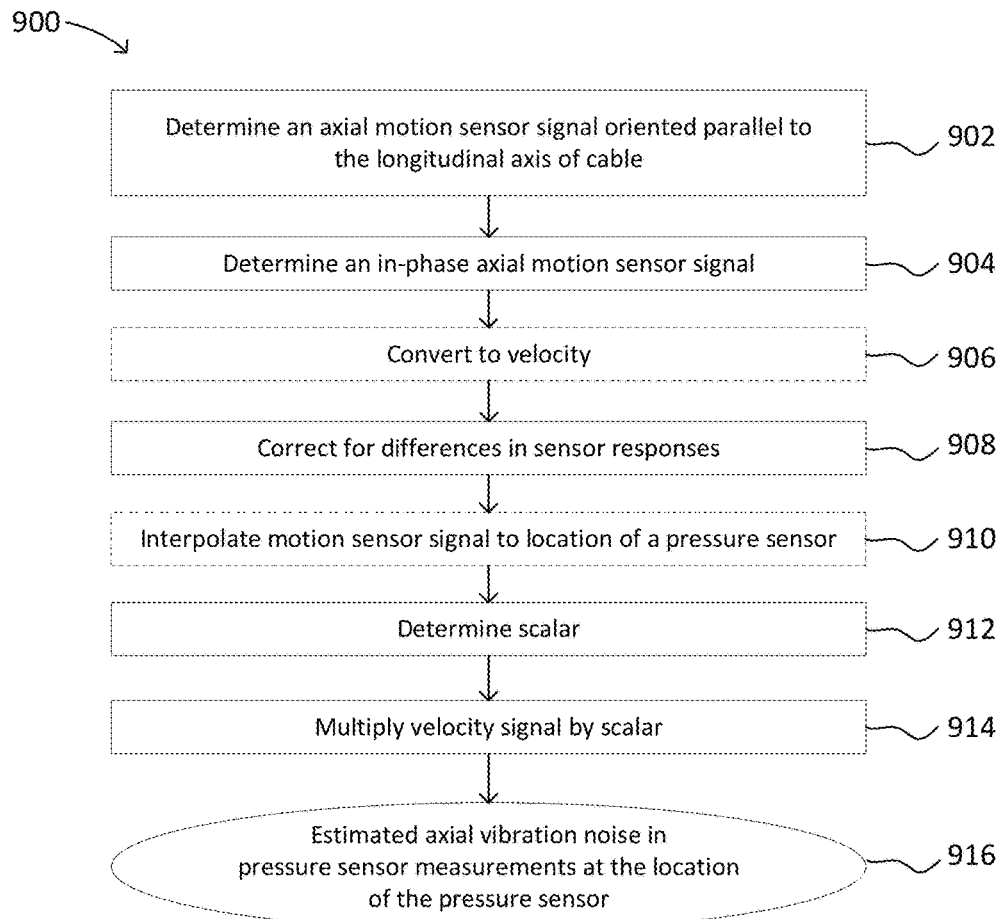
FIG. 9 is a flow diagram illustrating a method, according to embodiments, for generating the estimated axial vibration noise referred to in FIG. 8.

FIG. 9 illustrates an example method 900 for performing the estimation of axial vibration noise referred to in step 804 of method 800. In step 902, an axial motion sensor signal is determined such that the signal is oriented along or is parallel to the longitudinal axis 502 of the cable. Step 902 may be performed, for example, according to any of the techniques described above in relation to FIGS. 6 and 7. The axial motion sensor signal of step 902 constitutes a composite signal in the sense that it contains information about vibrations that are propagating forward along the cable from back to front, as well as information about vibrations that are propagating backward along the cable from front to back. Thus, the axial motion sensor signal of step 902 may contain out-of-phase motion information because forward propagating signal components are 180 degrees out of phase relative to backward propagating signal components. This is due to the fact that motion sensor measurements are vector measurements, so the sign of an axial signal is dependent on its direction. In step 904, therefore, an in-phase axial motion sensor signal is determined. Techniques for doing so will be described in detail further below.

At step 906, motion sensor signals are converted to velocity signals if the motion sensor signals are not velocity signals natively, as they would be if the motions sensors in use are velocity sensors. For example, in the embodiment illustrated in FIG. 5, the motion sensor in use is an accelerometer whose axial signals is denoted $A'_x$. The axial accelerometer measurement $A'_x$ can be converted readily into a velocity signal by time integrating the acceleration signal $A'_x$, since acceleration is the derivative of velocity with respect to time.

At step 908, a correction is made to compensate for the differences between motion sensor responses and pressure sensor responses. As was mentioned above, pressure sensors and motion sensors are, in general, different types of sensors, and thus raw magnitudes on the outputs of the two types of sensors may have different ranges. In addition, one type of sensor may be deployed in groups with a single output per group, whereas another type of sensor may not be grouped. Moreover, responses of both types of sensors may be frequency dependent. The objective and result of step 908 is to compensate for such differences such that a corrected motion sensor signal is produced whose range is comparable to that of a pressure sensor signal over the measurement domain of interest. Persons having skill in the art and having reference to this disclosure will appreciate that the specifics of such a correction step will depend on the types of sensors being used in a given application, but that the correction can readily be achieved by applying an appropriate transformation to the motion sensor signals.

At step 910, if the motion sensors in use are not physically associated with the locations of corresponding pressure sensors, then the motion sensor signals along the cable may be interpolated to the physical locations of the pressure sensors. If, on the other hand, the motion sensors are physically associated with the locations of the corresponding pressure sensors, then step 910 may not be necessary.

In steps 912 and 914, reference is made to determining a scalar and multiplying by the scalar. On one hand, velocity and pressure are different physical quantities, so the axial vibrations measured in terms of velocity cannot be used directly to estimate axial vibration noise in pressure sensor measurements. On the other hand, pressure fluctuations are related to particle velocity and to acoustic impedance. The scalar referred to in steps 912 and 914 is used to quantify the just-described relationship between pressure fluctuations, particle velocity, and acoustic impedance. The scalar determined in step 912 is generally specific to a given motion sensor. Thus, a different scalar may be determined for each of the motion sensors along the cable. An example method for determining the scalar for a given motion sensor will be further described below in relation to FIG. 16. Once the scalar has been determined for a particular motion sensor, in step 914 the corresponding velocity signal is multiplied by the scalar so determined.

The result of performing steps 902-914 as described above is the production of estimated axial vibration noise in pressure sensor measurements at a location of interest, as indicated at 916. Note that not all of steps 902-914 need to be performed. Step 906 may be omitted, for example, when the motion sensor signals are natively velocity signals, and step 910 may be omitted if the motion sensors are physically associated with the locations of the pressure sensors. Moreover, the steps may potentially be performed in different orders than shown. For example, step 906 may be performed at any stage prior to performing step 914.

Figure 10:
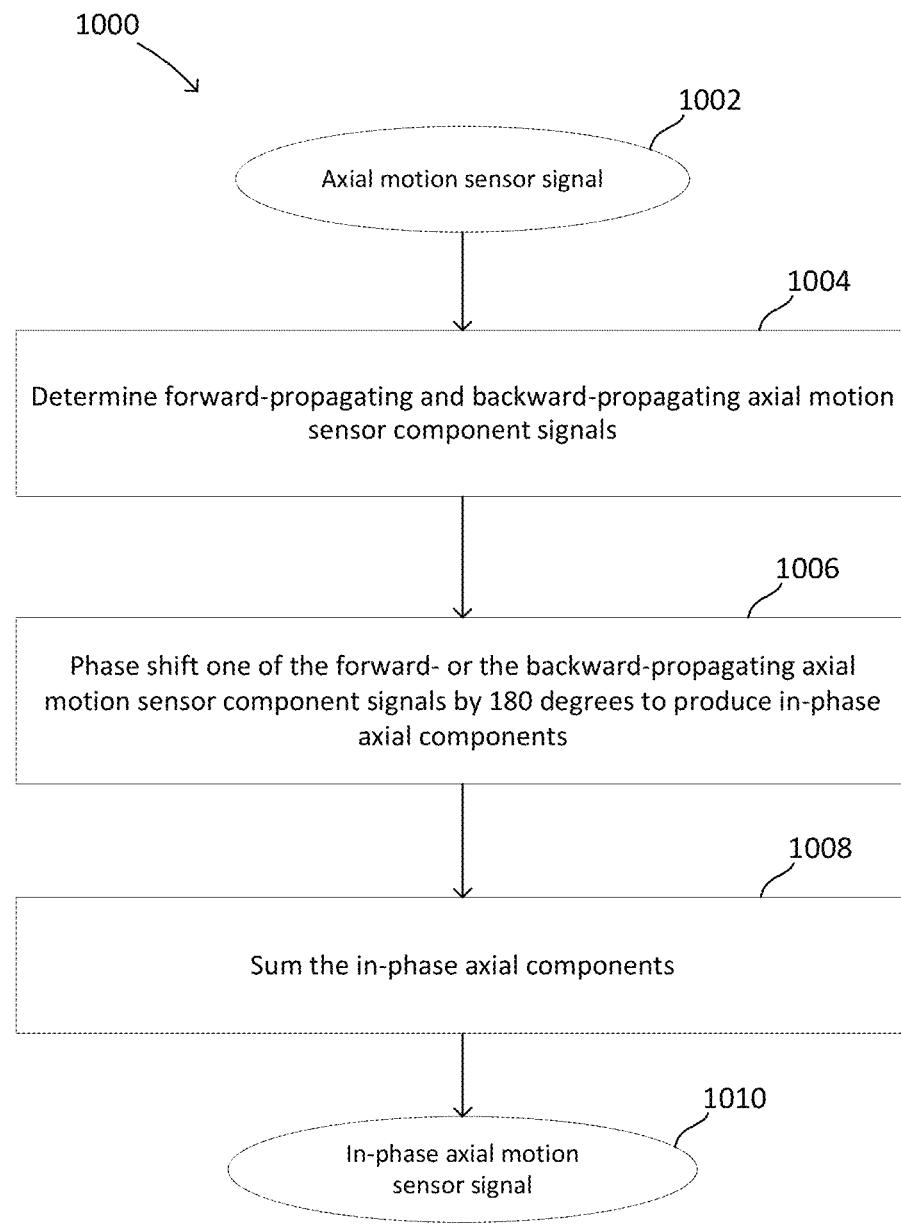
FIG. 10 is a flow diagram illustrating a further method, according to embodiments, for generating the in-phase axial motion sensor signal referred to in FIG. 9.

FIG. 10 illustrates a method 1000 for determining the in-phase axial motion sensor signal referred to in step 904 of method 900. As indicated at 1002, the method starts with axial signals recorded from motion sensors, such as accelerometers or velocity sensors. At step 1004, the axial motion sensor signals are decomposed into forward propagating and backward propagating axial motion sensor component signals. In this context, forward propagation and backward propagation simply refer to opposite directions along a longitudinal streamer axis such as axis 502. The choice of which direction is forward and which direction is backward is arbitrary and can be chosen to be either direction. The forward and backward propagating component signals represent vectors in opposite directions, so the two component signals are brought into phase with one another at step 1006 by phase shifting one of the two component signals by 180 degrees. Because, in this case, the phase shift desired is exactly 180 degrees, it may be accomplished in the space-time domain by simply multiplying one of the component signals by −1. If desired, however, the phase shift may be performed in a transformed domain such as the frequency domain. At step 1008, the in-phase component motion sensor signals are summed together to produce an in-phase axial motion sensor signal, as indicated at 1010.

Several example methods for determining the forward and backward propagating axial motion sensor component signals referred to in step 1004 of method 1000 will now be described in relation to FIGS. 11-15. In general, forward propagating and backward propagating axial component signals can be determined at the location of one motion sensor by considering information gathered from all of the motion sensors disposed along the cable. In one class of example embodiments, such as those described below in relation to FIGS. 11 and 12, this can be done using any one of a variety of plane wave decomposition techniques. In another class of example embodiments, such as those described below in relation to FIGS. 13 and 14, this can be done using a time-alignment technique.

Figure 11:
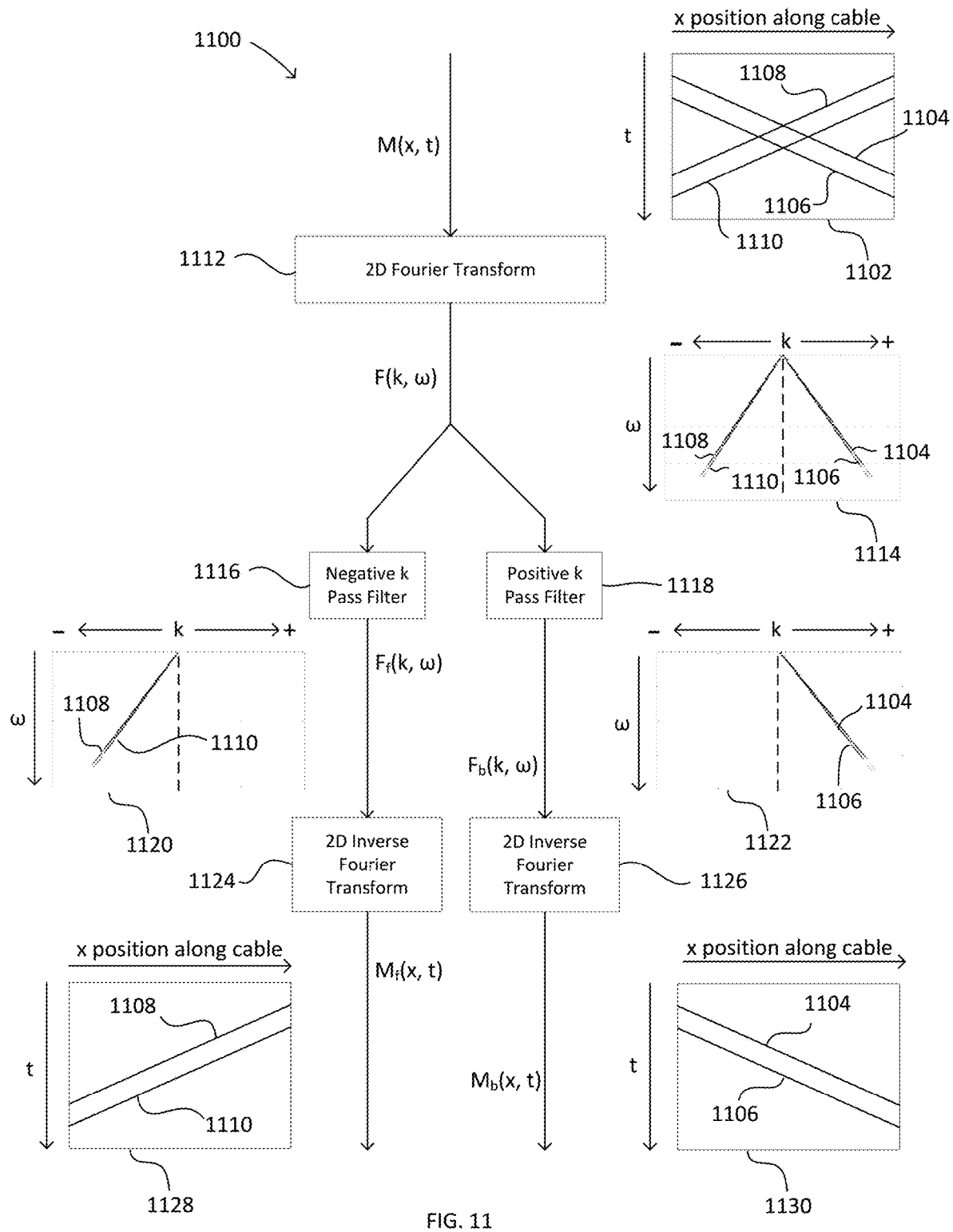
FIG. 11 is a flow diagram illustrating a first method, according to embodiments, for determining the forward propagating and backward propagating axial motion sensor component signals referred to in FIG. 10.

FIG. 11 illustrates a first example plane wave decomposition technique 1100. Graph 1102 illustrates four vibration noise events propagating along the longitudinal axis of a sensor cable. Events 1104, 1106 are backward propagating noise signals, originating at the front end of the cable at position x=0 and propagating backward, eventually reaching the back end of the cable at later times. Events 1108, 1110 are forward propagating noise signals, origination at the back end of the cable and propagating forward, eventually reaching the front end of the cable at later times. M(x, t) represents all motion sensor signals along the cable, each of which is associated with a particular x position along the cable, and each of which varies with time t.

At step 1112, a two-dimensional Fourier transform is performed on the motion sensor signals M(x, t). The two-dimensional Fourier transform results in a function of wavenumber, k, and angular frequency, ω. This function is denoted by F(k, ω) and is illustrated in graph 1114. As can be seen in graph 1114, the forward propagating noise events appear in the k-ω domain as lines with negative wavenumbers, while the backward propagating noise events appear as lines with positive wavenumbers.

At steps 1116 and 1118, wavenumber filters are applied to the signal F(k, ω). Step 1116 applies a negative-k pass filter to isolate just the forward propagating events, as shown in graph 1120. Step 1118 applies a positive-k pass filter to isolate just the backward propagating events. as shown in graph 1122. The isolated forward propagating events are denoted as $F_f(k, ω)$. The isolated backward propagating events are denoted $F_b(k, ω)$.

At steps 1124, 1126, two-dimensional inverse Fourier transforms are performed on $F_f(k, ω)$ and $F_b(k, ω)$, respectively. The results of these transforms are the space-time domain signals illustrated in graphs 1128 and 1130. In graph 1128, it can be seen that the forward propagating events 1108, 1110 have been isolated. These signals are denoted by $M_f(x, t)$. Similarly, in graph 1130, it can be seen that the backward propagating events 1104, 1106 have been isolated. These signals are denoted by $M_b(x, t)$. Signals $M_f(x, t)$ and $M_b(x, t)$ represent, respectively, the forward propagating and backward propagating axial motion sensor components signals referred to in step 1004 of method 1000.

Figure 12:
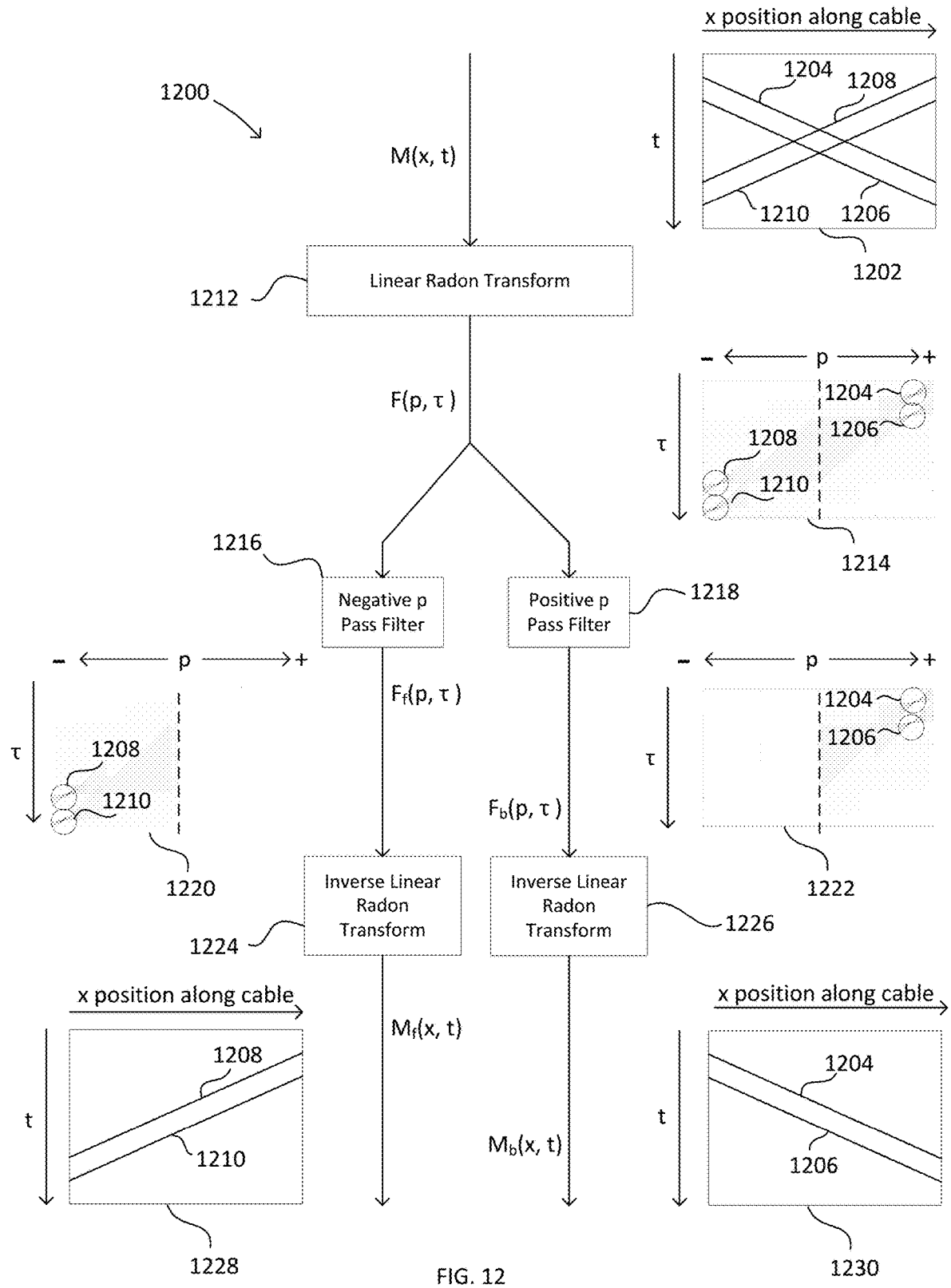
FIG. 12 is a flow diagram illustrating another method, according to embodiments, for determining the forward propagating and backward propagating axial motion sensor component signals referred to in FIG. 10.

FIG. 12 illustrates a second example plane wave decomposition technique 1200. As in FIG. 11, graph 1202 illustrates four vibration noise events propagating along the longitudinal axis of a sensor cable. Events 1204, 1206 are backward propagating noise signals, originating at the front end of the cable at position x=0 and propagating backward, eventually reaching the back end of the cable at later times. Events 1208, 1210 are forward propagating noise signals, originating at the back end of the cable and propagating forward, eventually reaching the front end of the cable at later times. M(x, t) represents all motion sensor signals along the cable, each of which is associated with a particular x position along the cable, and each of which varies with time t.

In the case of technique 1200, a linear Radon transform is performed on the motion sensor signals M(x, t) at 1212. The linear Radon transform results in a function of slowness, p, and intercept time τ. This function is denoted by F(p, τ) and is illustrated in graph 1214. As can be seen in graph 1214, the forward propagating noise events appear in the p, τ domain as points with negative slowness values, while the backward propagating noise events appear as points with positive slowness values.

At steps 1216 and 1218, slowness filters are applied to the signal F(p, τ). Step 1216 applies a negative-p pass filter to isolate just the forward propagating events, as shown in graph 1220. Step 1218 applies a positive-p pass filter to isolate just the backward propagating events. as shown in graph 1222. The isolated forward propagating events are denoted as $F_f(p, τ)$. The isolated backward propagating events are denoted $F_b(p, τ)$.

At steps 1224, 1226, inverse linear Radon transforms are performed on $F_f(p, τ)$ and $F_b(p, τ)$, respectively. The results of these transforms are the space-time domain signals illustrated in graphs 1228 and 1230. In graph 1228, it can be seen that the forward propagating events 1208, 1210 have been isolated. These signals are denoted by $M_f(x, t)$. Similarly, in graph 1230, it can be seen that the backward propagating events 1204, 1206 have been isolated. These signals are denoted by $M_b(x, t)$. As was the case in FIG. 11, signals $M_f(x, t)$ and $M_b(x, t)$ in FIG. 12 represent, respectively, the forward propagating and backward propagating axial motion sensor components signals referred to in step 1004 of method 1000.

Figure 13:
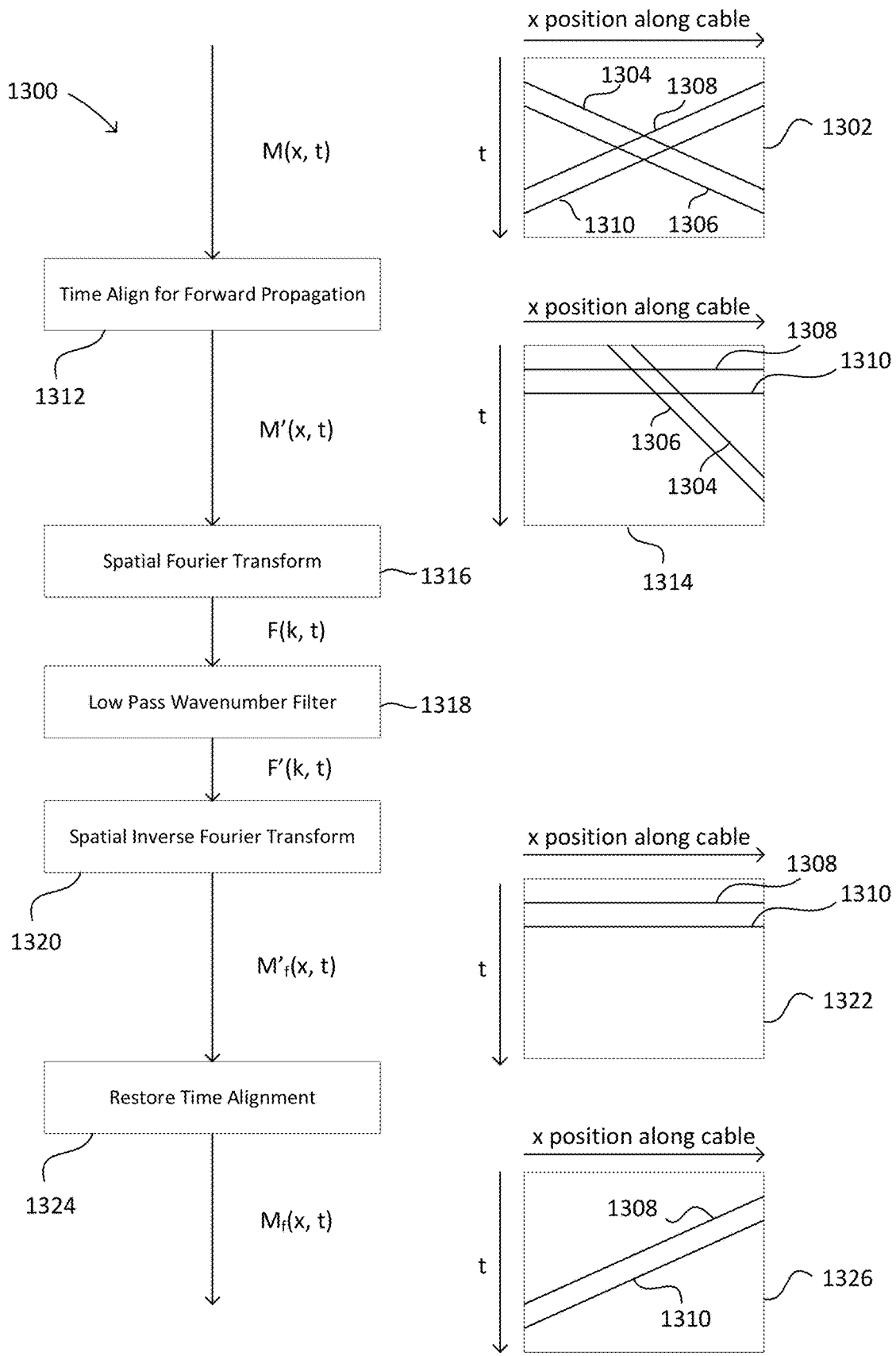
FIGS. 13 and 14 are flow diagrams illustrating another method, according to embodiments, for determining the forward propagating and backward propagating axial motion sensor component signals referred to in FIG. 10.
Figure 14:
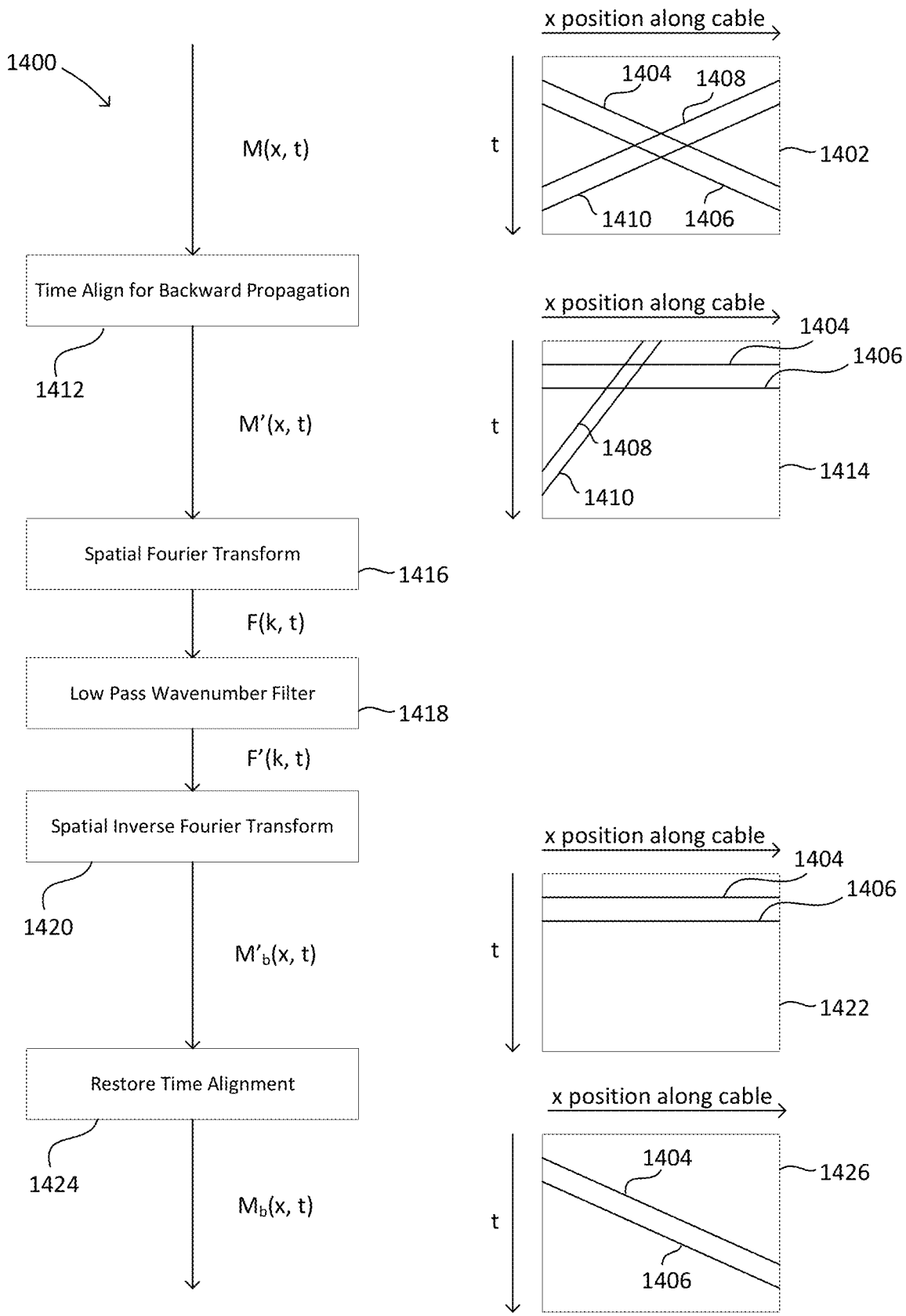

FIGS. 13 and 14 illustrate a time alignment technique for determining the forward and backward propagating axial motion sensor component signals referred to in step 1004 of method 1000. This technique determines the forward and backward propagating components by time-aligning measurements from the motion sensors in the cable based on known positions of the motion sensors and on known axial vibration propagation velocities in the cable. A first set of time adjustments is applied to the motion sensor signals to isolate forward propagating signals, while a second set of time adjustments is applied to isolate backward propagating signals. In either case, once the time alignment has been performed, a horizontal low-pass filter is applied to the time-aligned motion sensor measurements to isolate the forward or the backward propagating signals.

To illustrate this, FIG. 13 presents an example procedure 1300 for isolating the forward propagating axial motion sensor component signals. Graph 1302 illustrates four vibration noise events propagating along the longitudinal axis of a sensor cable. Events 1304, 1306 are backward propagating noise signals, originating at the front end of the cable at position x=0 and propagating backward, eventually reaching the back end of the cable at later times. Events 1308, 1310 are forward propagating noise signals, origination at the back end of the cable and propagating forward, eventually reaching the front end of the cable at later times. M(x, t) represents all motion sensor signals along the cable, each of which is associated with a particular location x along the cable, and each of which varies with time t.

In step 1312, a set of time adjustments is applied to the signals M(x, t) using the known x positions of each of the motion sensors along the cable and using a known forward propagation velocity of axial vibrations in the cable. The result of applying the time adjustments is illustrated in graph 1314, in which the forward propagating noise events 1308, 1310 appear as horizontal lines—as if all of the motion sensors in the cable registered each noise event simultaneously, at a first time for the first noise event and at a second time for the second noise event. In contrast to this, the backward propagating noise events 1304, 1306 appear as steeper lines as a result of the time adjustments. The time adjusted motion sensor signals are denoted M'(x, t).

In step 1316, a spatial Fourier transform is applied to the time adjusted motion sensor signals M'(x, t). That is, for a given time, a Fourier transform is performed across the set of x position motion sensor samples along the length of the cable, each sample corresponding to the given time. The result of the spatial Fourier transform is a function in the wavenumber-time domain and is denoted F(k, t). Due to the nature of the spatial Fourier transform, the forward propagating signals (corresponding to the horizontal lines in graph 1314) appear as signals with extremely low wavenumbers in F(k, t), while the backward propagating signals (corresponding to the steeper lines in graph 1314) appear as signals with higher wavenumbers in F(k, t). Because the forward propagating signals have been flattened, their amplitudes change very slowly along the longitudinal (x) axis. Hence these signals appear at very low wavenumbers in F(k, t). This is analogous to what would be seen after a temporal Fourier transform is applied to a signal that changes slowly with time, wherein the energy of the signal would be seen at very low frequencies.

In step 1318, a low-pass wavenumber filter is applied to F(k, t), yielding a modified function denoted F'(k, t), in which the backward propagating energy has been attenuated or eliminated.

In step 1320, a spatial inverse Fourier transform is applied to the modified signal F'(k, t), which transforms the signal back to the distance-time domain. The reverse transformed signal is denoted M'$_f$(x, t) and is illustrated in graph 1322. As can be seen in the graph, the steeper lines corresponding to backward propagating noise events 1304, 1306 have been eliminated.

In step 1324, the time adjustments that were applied in step 1312 are reversed, yielding an unadjusted time signal M$_f$(x, t) that contains the forward propagating noise events but does not contain the backward propagating noise events, as shown in graph 1326.

FIG. 14 illustrates a similar example procedure 1400 for isolating the backward propagating axial motion sensor component signals. Graph 1402 illustrates four vibration noise events propagating along the longitudinal axis of a sensor cable. Events 1404, 1406 are backward propagating noise signals, originating at the front end of the cable at position x=0 and propagating backward, eventually reaching the back end of the cable at later times. Events 1408, 1410 are forward propagating noise signals, origination at the back end of the cable and propagating forward, eventually reaching the front end of the cable at later times. M(x, t) represents all motion sensor signals along the cable, each of which is associated with a particular location x along the cable, and each of which varies with time t.

In step 1412, a set of time adjustments is applied to the signals M(x, t) using the known x positions of each of the motion sensors along the cable and using a known backward propagation velocity of axial vibrations in the cable. The result of applying the time adjustments is illustrated in graph 1414, in which the backward propagating noise events 1404, 1406 appear as horizontal lines—as if all of the motion sensors in the cable registered each noise event simultaneously, at a first time for the first noise event and at a second time for the second noise event. In contrast to this, the forward propagating noise events 1408, 1410 appear as steeper lines as a result of the time adjustments. The time adjusted motion sensor signals are denoted M'(x, t).

In step 1416, a spatial Fourier transform is applied to the time adjusted motion sensor signals M'(x, t). That is, for a given time, a Fourier transform is performed across the set of x position motion sensor samples along the length of the cable, each sample corresponding to the given time. The result of the spatial Fourier transform is a function in the wavenumber-time domain and is denoted F(k, t). Due to the nature of the spatial Fourier transform, the backward propagating signals (corresponding to the horizontal lines in graph 1414) appear as signals with extremely low wavenumbers in F(k, t), while the forward propagating signals (corresponding to the steeper lines in graph 1414) appear as signals with higher wavenumbers in F(k, t). As was explained above, because the backward propagating signals have been flattened, their amplitudes change very slowly along the longitudinal (x) axis. Hence these signals appear at very low wavenumbers in F(k, t). Again, this is analogous to what would be seen after a temporal Fourier transform is applied to a signal that changes slowly with time, wherein the energy of the signal would be seen at very low frequencies.

In step 1418, a low-pass wavenumber filter is applied to F(k, t), yielding a modified function denoted F'(k, t), in which the forward propagating energy has been attenuated or eliminated.

In step 1420, a spatial inverse Fourier transform is applied to the modified signal F'(k, t), which transforms the signal back to the distance-time domain. The reverse transformed signal is denoted M'$_b$(x, t) and is illustrated in graph 1422. As can be seen in the graph, the steeper lines corresponding to forward propagating noise events 1408, 1410 have been eliminated.

In step 1424, the time adjustments that were applied in step 1412 are reversed, yielding an unadjusted time signal M$_b$(x, t) that contains the backward propagating noise events but does not contain the forward propagating noise events, as shown in graph 1426.

Any of the methods described above in relation to FIGS. 10-14 may be performed in a first process to isolate the forward propagating signals and in a second process to isolate the backward propagating signals. The two processes may be performed in any order relative to one other, or they may be performed simultaneously. The processes may also be performed iteratively, as will now be described in relation to FIG. 15.

Figure 15:
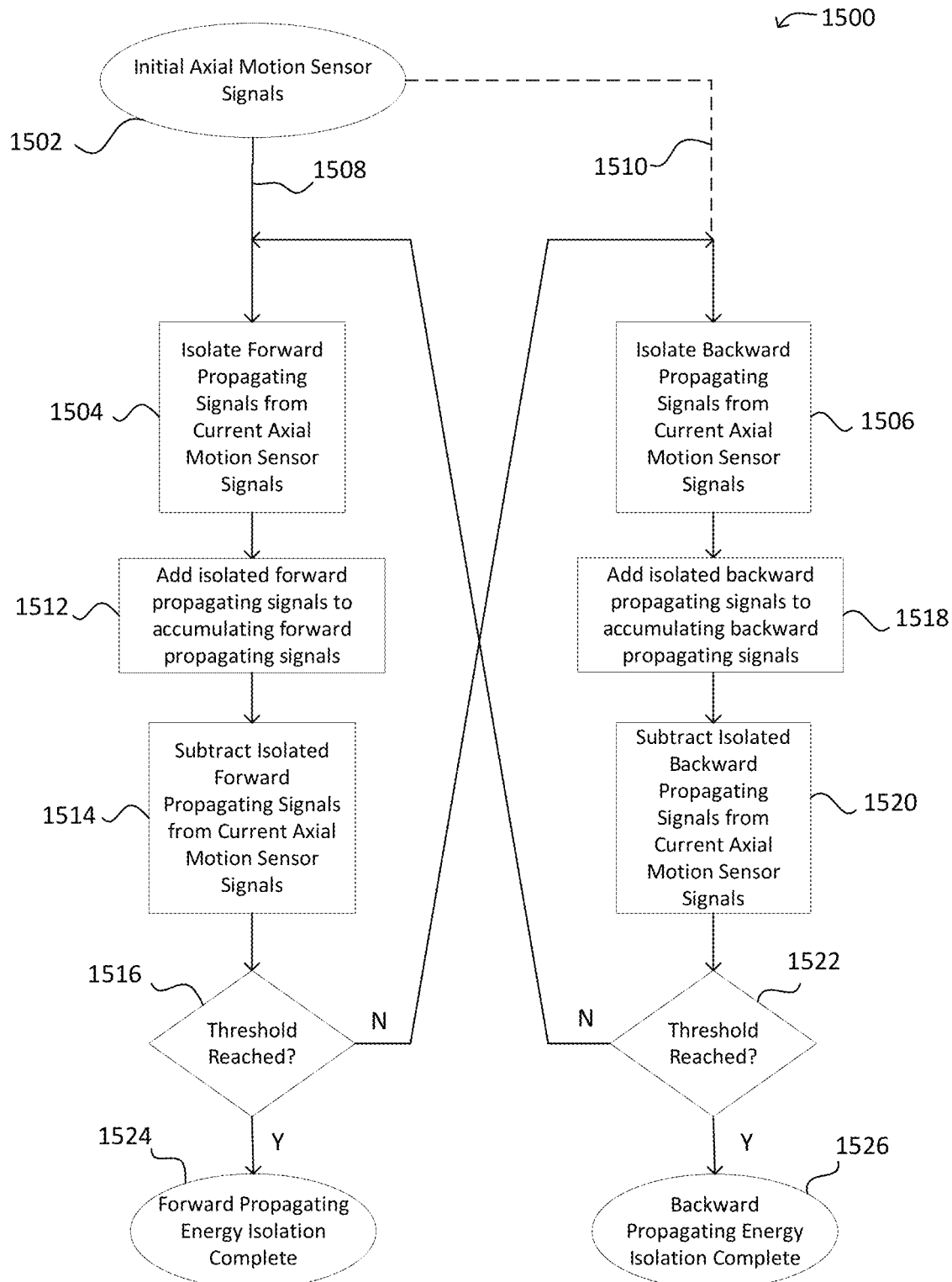
FIG. 15 is a flow diagram illustrating an iterative technique that may be employed with any of the methods of FIGS. 11-14, in accordance with embodiments.

FIG. 15 illustrates an example method 1500 in which the forward and backward propagating axial components are isolated using an iterative process, in which an output from a first procedure 1504, 1514 is applied as an input to a second procedure 1506, 1520 until one or more threshold conditions 1516, 1522 is reached.

Method 1500 begins with an initial set of axial motion sensor signals 1502. Either of steps 1504 or 1506 may be performed first, as indicated at 1508, 1510. For the sake of illustration, assume that step 1504 is performed first. In step 1504, any of the above-described techniques may be employed to produce isolated forward propagating signals from a current set of axial motion sensor signals. (In the first iteration, the initial set 1502 is taken to be the current set of axial motion sensor signals.) In step 1512, the forward propagating signals so isolated are added to a forward propagating signal being accumulated by the method 1500. (At the start of the initial iteration of method 1500, the forward propagating signal being accumulated may be a null signal.) In step 1514, the isolated forward propagating motion sensor signals are subtracted from the current set of axial motion sensor signals. The output of step 1514 may be a set of axial motion sensor signals wherein some, but not all, of the forward propagating energy has been removed.

In step 1516, a determination is made as to whether the forward propagating energy has been sufficiently isolated and removed. During each iteration of method 1500, the reduction in amplitude of the current axial motion sensor signals caused by subtraction step 1514 becomes smaller and smaller. Thus, the determination of step 1516 may be based simply on whether the reduction in amplitude achieved by the subtraction step has fallen below a threshold amplitude reduction. Other suitable techniques may also be employed to implement step 1516, such as by determining whether a correlation between isolated forward propagating signals 1512 and the output of step 1514 is below a threshold, or by determining whether a certain number of iterations of steps 1504 and 1514 have been performed.

If it is determined in step 1516 that the threshold condition has been met, then the forward propagating isolation process is considered complete, as indicated at 1524. If, however, the threshold is not met, then the iterative procedure continues with step 1506. In step 1506, the output of step 1514 is considered the current set of axial motion sensor signals, and this set of signals is applied as an input to step 1506. In step 1506, any of the above-described techniques may be employed to produce isolated backward propagating signals from the current set of axial motion sensor signals. In step 1518, the backward propagating signals so isolated are added to a backward propagating signal being accumulated by method 1500. (At the start of the initial iteration of method 1500, the backward propagating signal being accumulated may be a null signal.) In step 1520, backward propagating signals so isolated are subtracted from the current axial motion sensor signals.

As in step 1516, in step 1522 a determination is made as to whether the backward propagating energy has been sufficiently isolated and removed from the current set of axial motion sensor signals. This determination may be made similarly to the determination made in step 1516. If it is determined in step 1522 that the threshold has been met, then the backward propagating energy isolation procedure is considered complete, as indicated at 1526. If not, then another iteration may be performed, in which the current axial motion sensor signals from step 1520 are applied as inputs to step 1504.

Figure 16:
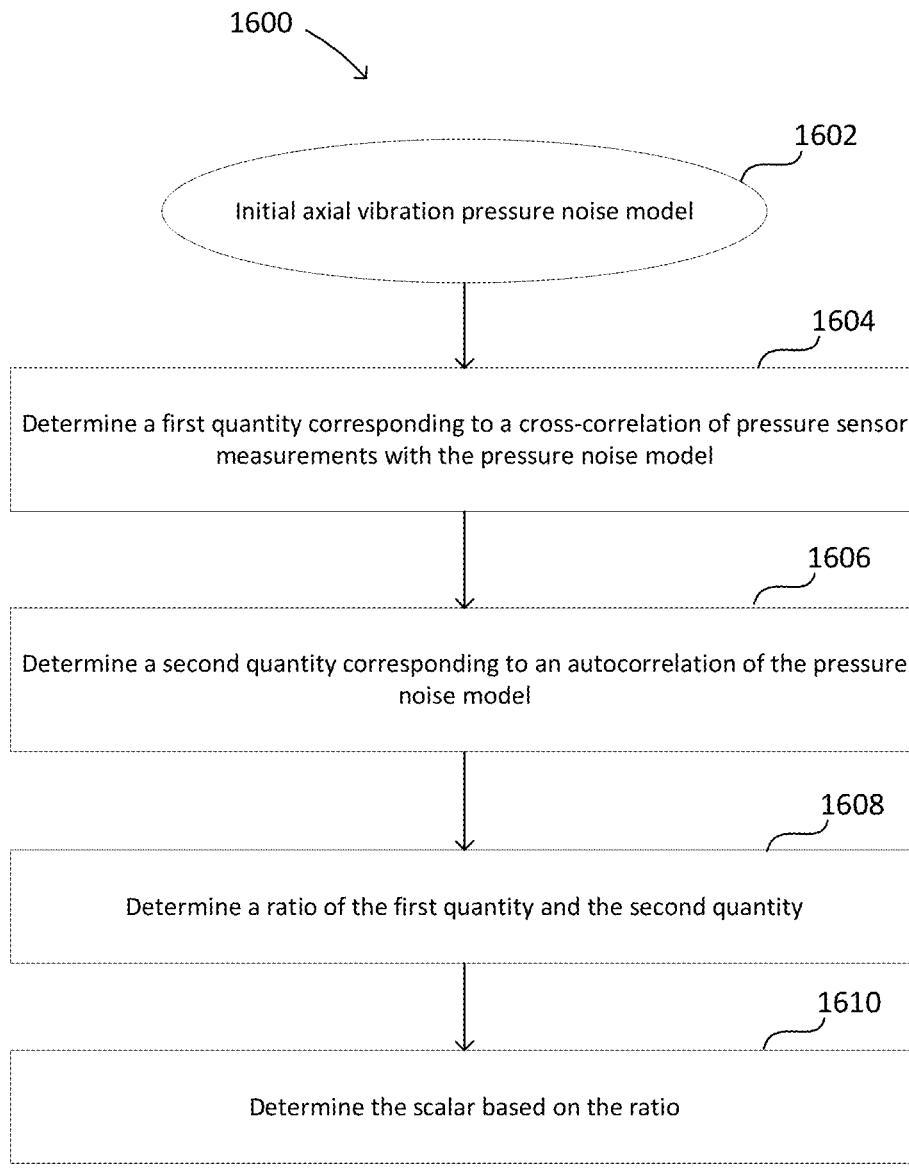
FIG. 16 is a flow diagram illustrating a method, according to embodiments, for determining the scalar referred to in FIG. 9.

FIG. 16 is a flow diagram illustrating an example method for determining the scalar that is referred to in steps 912 and 914 of method 900. The time series of the recorded pressure sensor measurements at a given location may be expressed as R(t)=S(t)+N$_r$(t), where R(t) is the pressure sensor data, S(t) is the seismic signal of interest at the location, and N$_r$(t) is recorded noise at the location. The cross-correlation of the recorded pressure sensor measurements with the noise model derived from the motion sensors at the location may be expressed as $$R(t) \times N_m(t) = [S(t) + N_r(t)] \times N_m(t) = S(t) \times N_m(t) + N_r(t) \times N_m(t), \quad (8)$$

where N$_m$(t) is the noise model derived from the motion sensors at the location, and where X denotes a cross-correlation. Assuming the seismic signal S does not correlate with the noise model, S(t)×N$_m$(t) is zero. It follows that the cross correlation of the recorded seismic data with the noise model can be expressed as $$R(t) \times N_m(t) = N_r(t) \times N_m(t). \quad (9)$$

The scalar, Sc, to be applied to the noise model may then be derived from the following expression $$Sc = \frac{1}{N} \sum \frac{N_r(t) \times N_m(t)}{N_m(t) \times N_m(t)} = \frac{1}{N} \sum \frac{R(t) \times N_m(t)}{N_m(t) \times N_m(t)}, \quad (10)$$

where Sc is the scalar, and N is the number of data samples in the cross-correlations.

Consistent with the above, method 1600 begins with an initial axial vibration pressure noise model at the location of one of the motion sensors in the sensor cable, as indicated at 1602. This model may be determined according to any of the methods described above based on measurements recorded from motion sensors within the cable. The model may correspond, for example, to the output of step 906 in method 900. Let the initial noise model derived from the motion sensors be denoted N$_m$(t) and let the actual pressure sensor measurements corresponding to the location be denoted R(t). In step 1604, a first quantity, R(t)×N$_m$(t), is determined, corresponding to a cross-correlation of the pressure sensor measurements at the location with the pressure noise model. In step 1608, a second quantity, N$_m$(t)×N$_m$(t), is determined corresponding to an autocorrelation of the pressure noise model. In step 1608, a ratio of the first quantity to the second quantity is determined. In step 1610, the scalar is determined based on the ratio of step 1608, for example based on equation 10.

Results obtained by applying the above-described techniques to real data can be visualized with reference to FIGS. 17-20.

Figures 17A, 17B, 17C, 17D, 18A, 18B:
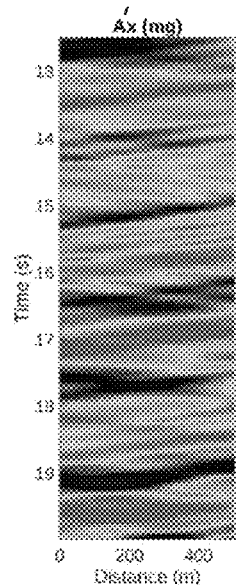
FIGS. 17A-17C are graphs illustrating motion sensor signals before and after the determination of forward and backward propagating axial components referred to in FIG. 10.
FIG. 17D is a graph illustrating pressure sensor signals corresponding to the times and locations of the motion sensor signals in FIGS. 17A-17C.
FIGS. 18A and 18B are graphs illustrating results of the phase shift referred to in FIG. 10, and the conversion to velocity referred to in FIG. 9, applied to the motion sensor signals of FIGS. 17B and 17C.

In each of FIGS. 17A-17D, time is shown on the vertical axis, and distance is shown on the horizontal axis. FIGS. 17A, 17B and 17C all refer to axial information provided by motion sensors. In this case, the motion sensors are accelerometers. Thus, $A'_x$ (inline acceleration) values are shown with magnitudes corresponding to the greyscale legend to the right of the figure. FIG. 17A shows $A'_x$ values at sensor locations before the determination of forward and backward propagating components. FIGS. 17B and 17C show the results of performing the decomposition procedure on the signals of FIG. 17A. Specifically, FIG. 17B shows components from FIG. 17A that correspond to vibrations propagating in a first direction along the streamer axis. FIG. 17C shows components from FIG. 17A that correspond to vibrations propagating in the opposite direction along the streamer axis. FIG. 17D shows measurements provided by pressure sensors (or pressure sensor groups) corresponding to the same locations along the streamer as are depicted in FIGS. 17A-17C. Pressure magnitudes are shown in mBar units with magnitudes corresponding to the greyscale legend to the right of the figure.

FIGS. 18A and 18B show the inline accelerometer measurements of FIGS. 17B and 17C, respectively, after conversion from acceleration values to particle velocity values via time-integration, and after the values corresponding to FIG. 17C have been phase shifted by 180 degrees.

After converting the inline acceleration measurements into particle velocity and applying the 180 degrees phase shift to the vibrations propagating in one direction, the response to axial vibrations in pressure sensor measurements can be estimated by summing the in-phase measurements and multiplying by a scalar, such as a scalar determined as described above. FIG. 19B illustrates the estimated axial vibration noise derived from summing and scaling the values shown in FIGS. 18A and 18B. This estimated axial vibration noise is subtracted from the from pressure sensor measurements corresponding to the locations at which the axial vibration noise was estimated. If desired, any of a variety of known adaptive subtraction techniques may be employed to implement the subtraction procedure.

Figure 19A:
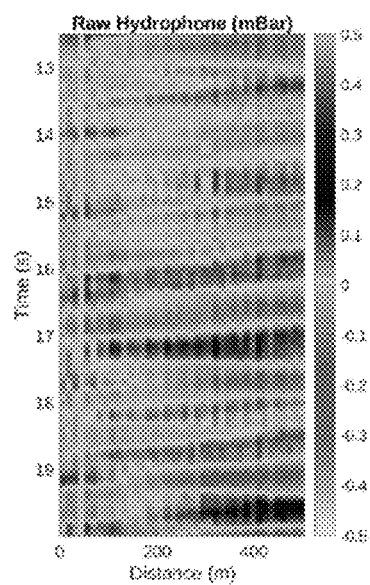
FIG. 19A is a graph illustrating the raw pressure sensor signals of FIG. 17D.
Figure 19B:
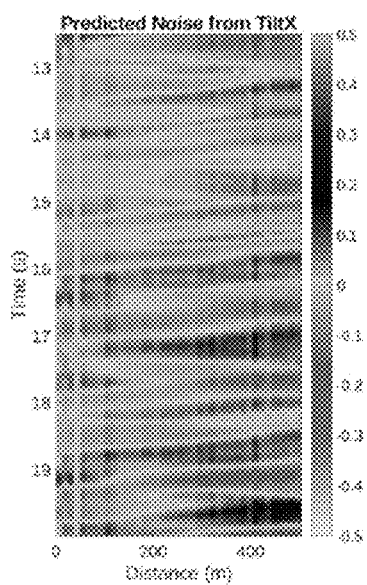
FIG. 19B is a graph illustrating estimated axial vibration noise in pressure sensor measurements, generated based on motion sensor measurements, in accordance with embodiments.
Figure 19C:
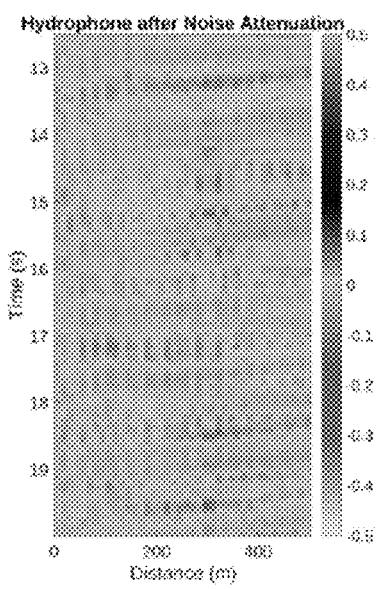
FIG. 19C is a graph illustrating the result of subtracting the estimated axial vibration noise of FIG. 19B from the pressure sensor signals of FIG. 19A.

To illustrate the results, FIG. 19A shows actual pressure sensor measurements corresponding to locations along a streamer. FIG. 19C shows the result of subtracting the estimated axial vibration noise at those locations (FIG. 19B) from the pressure sensor measurements at the same locations. As can be seen in FIG. 19C, axial vibration noise in the pressure sensor measurements has been reduced, while acoustic signals of interest have been preserved.

Figure 20A:
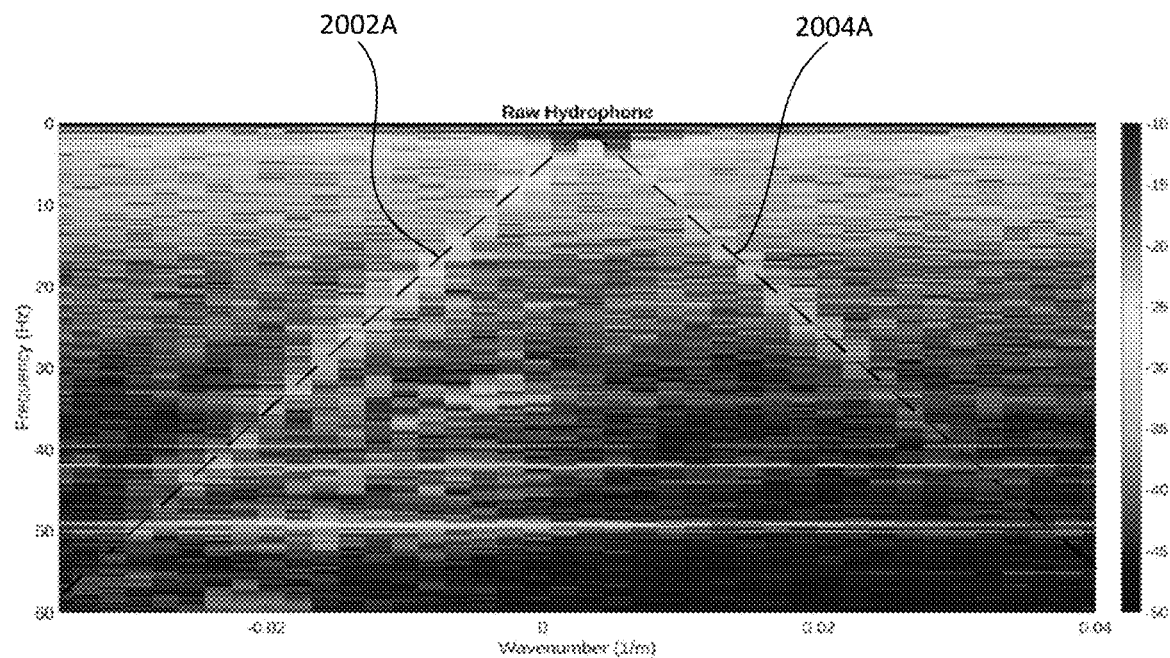
FIGS. 20A and 20B are graphs illustrating the signals of FIGS. 19A and 19C, respectively, transformed into the frequency vs. horizontal wavenumber domain.
Figure 20B:
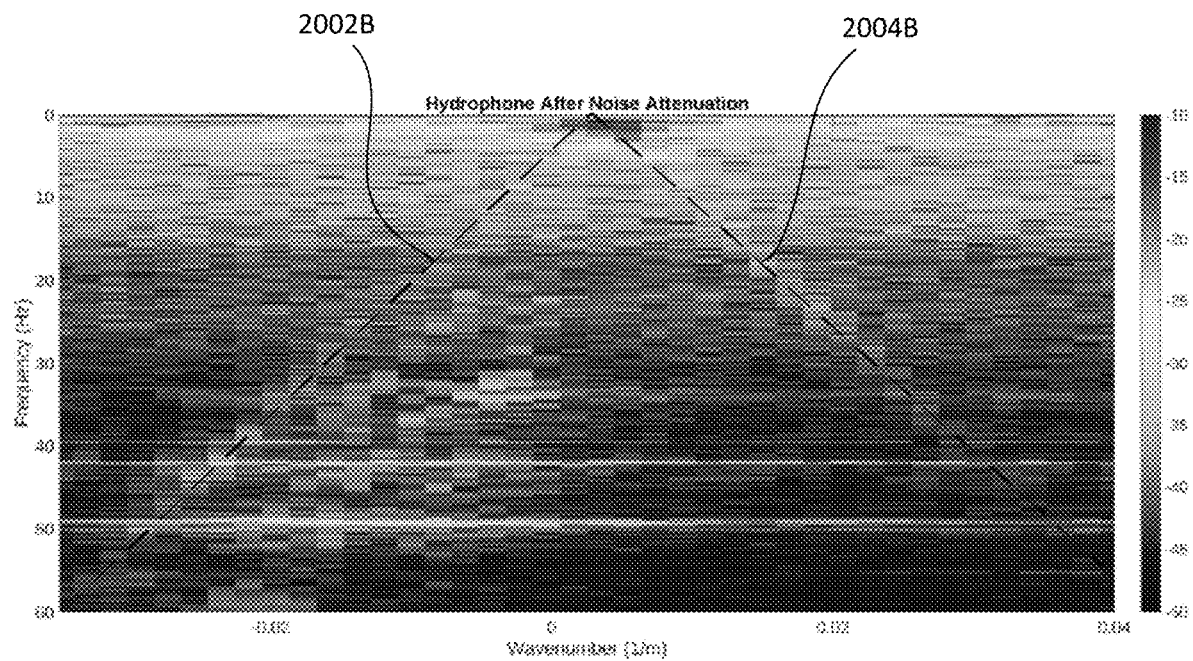

FIGS. 20A and 20B show the same result in the frequency vs. horizontal wavenumber domain. Specifically, FIG. 20A shows the raw pressure sensor measurements before noise removal. FIG. 20B shows them after attenuating axial vibration noise according to the just described methods. As can be seen in the diagrams, intensity values corresponding to axially propagating vibration noise (see diagonal lines 2002B and 2004B in FIG. 20B) have been attenuated relative to the corresponding intensity values appearing in FIG. 20A (see diagonal lines 2002A and 2004A).

Figure 21:
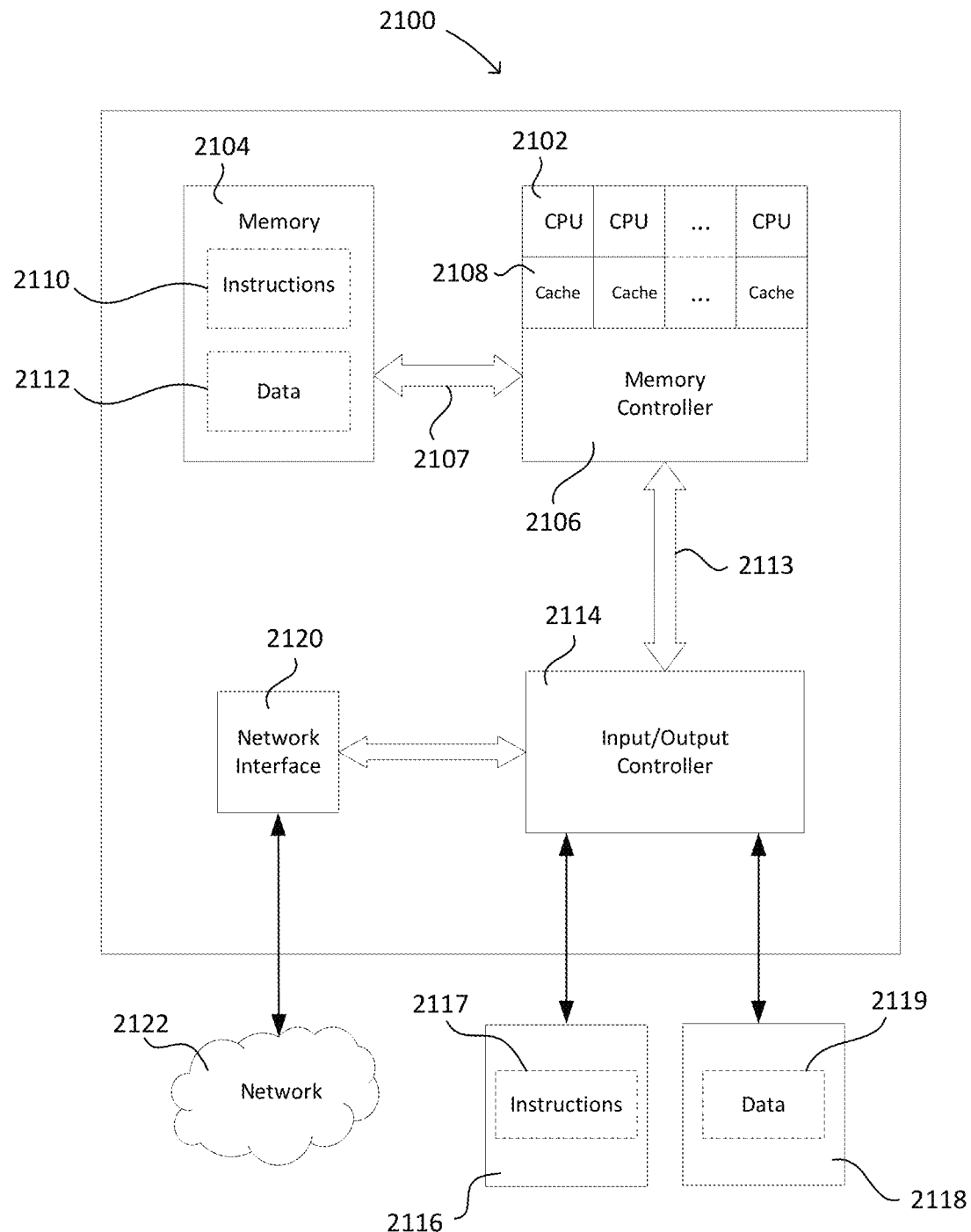
FIG. 21 is a block diagram illustrating an example computer system suitable for use in implementing methods according to embodiments.

FIG. 21 is a block diagram illustrating an example computer system 2100 that may be used to implement any of the methods described above. Computer system 2100 includes one or more central processor unit ("CPU") cores 2102 coupled to a system memory 2104 by a high-speed memory controller 2106 and an associated high-speed memory bus 2107. System memory 2104 typically comprises a large array of random-access memory locations, often housed in multiple dynamic random-access memory ("DRAM") devices, which in turn are housed in one or more dual inline memory module ("DIMM") packages. Each CPU core 2102 is associated with one or more levels of high-speed cache memory 2108, as shown. Each core 2102 can execute computer-readable instructions 2110 stored in system memory 2104, and can thereby perform operations on data 2112, also stored in system memory 2104.

Memory controller 2106 is coupled, via input/output bus 2113, to one or more input/output controllers such as input/output controller 2114. Input/output controller 2114 is in turn coupled to one or more tangible, non-volatile, computer readable media such as computer-readable medium 2116 and computer-readable medium 2118. Non-limiting examples of such computer-readable media include so-called solid-state disks ("SSDs"), spinning-media magnetic disks, optical disks, flash drives, magnetic tape, and the like. Media 2116, 2118 may be permanently attached to computer system 2100 or may be removable and portable. In the example shown, medium 2116 has instructions 2117 (e.g., software or firmware) stored therein, while medium 2118 has data 2119 stored therein. Operating system software executing on computer system 2100 may be employed to enable a variety of functions, including transfer of instructions 2110, 2117 and data 2112, 2119 back and forth between media 2116, 2118 and system memory 2104.

Computer system 2100 may represent a single, stand-alone computer workstation that is coupled to input/output devices such as a keyboard, pointing device and display. It may also represent one node in a larger, multi-node or multi-computer system such as a cluster, in which case access to its computing capabilities may be provided by software that interacts with and/or controls the cluster. Nodes in such a cluster may be collocated in a single data center or may be distributed across multiple locations or data centers in distinct geographic regions. Further still, computer system 2100 may represent an access point from which such a cluster or multi-computer system may be accessed and/or controlled. Any of these or their components or variants may be referred to herein as "computing apparatus" or a "computing device."

In example embodiments, data 2119 may correspond to sensor measurements or other data recorded during a marine geophysical survey, and instructions 2117 may correspond to algorithms for performing any of the methods described herein. In such embodiments, instructions 2117, when executed by one or more computing devices such as one or more of CPU cores 2102, cause the computing device to perform operations described herein on the data, producing results that may be stored in one or more tangible, non-volatile, computer-readable media such as medium 2118. In such embodiments, medium 2118 constitutes a geophysical data product that is manufactured by using the computing device to perform methods described herein and by storing the results in the medium. Geophysical data product 2118 may be stored locally or may be transported to other locations where further processing and analysis of its contents may be performed. If desired, a computer system such as computer system 2100 may be employed to transmit the geophysical data product electronically to other locations via a network interface 2120 and a network 2122 (e.g., the Internet). Upon receipt of the transmission, another geophysical data product may be manufactured at the receiving location by storing contents of the transmission, or processed versions thereof, in another tangible, non-volatile, computer readable medium. Similarly, geophysical data product 2118 may be manufactured by using a local computer system 2100 to access one or more remotely-located computing devices in order to execute instructions 2117 remotely, and then to store results from the computations on a medium 2118 that is attached either to the local computer or to one of the remote computers. The word "medium" as used herein should be construed to include one or more of such media.

Multiple specific embodiments have been described above and in the appended claims. Such embodiments have been provided by way of example and illustration. Persons having skill in the art and having reference to this disclosure will perceive various utilitarian combinations, modifications and generalizations of the features and characteristics of the embodiments so described. For example, steps in methods described herein may generally be performed in any order, and some steps may be omitted, while other steps may be added, except where the context clearly indicates otherwise. Similarly, components in structures described herein may be arranged in different positions or locations, and some components may be omitted, while other components may be added, except where the context clearly indicates otherwise. The scope of the disclosure is intended to include all such combinations, modifications, and generalizations as well as their equivalents.

What is claimed is:

1. A method of generating reduced noise pressure sensor measurements from measurements made by one or more pressure sensors disposed in a cable having a generally longitudinal axis, comprising:
   determining estimated axial vibration noise at a location along the cable based at least in part on measurements from one or more motion sensors disposed in the cable; and
   subtracting the estimated axial vibration noise from pressure sensor measurements corresponding to the location, thereby generating the reduced noise pressure measurements;
   wherein the one or more motion sensors comprise at least one three-axis accelerometer that defines mutually orthogonal x, y and z accelerometer axes and that is configured to produce three orthogonal component measurements Ax, Ay and Az corresponding to the x, y, and z mutually orthogonal accelerometer axes, respectively; and
   wherein determining the estimated axial vibration noise comprises determining an axial acceleration component by applying a rotation transformation to the orthogonal component measurements Ax, Ay and Az of the at least one three-axis accelerometer.

2. The method of claim 1, wherein determining the estimated axial vibration noise comprises:
   determining estimated axial velocity signals at the location; and
   scaling the estimated axial velocity signals.

3. The method of claim 2, wherein determining the estimated axial velocity signals comprises:
   associating forward and backward directions with the axis of the cable;
   determining forward and backward propagating axial components in motion sensor measurements; and
   summing the forward and backward propagating axial components after phase shifting one of the components by 180 degrees.

4. The method of claim 2, wherein:
   the one or more motion sensors comprise acceleration sensors; and
   determining the estimated axial velocity signals comprises time-integrating one or more signals derived from the acceleration sensors.

5. The method of claim 3, wherein determining the forward and backward propagating axial components comprises performing a plane-wave decomposition procedure.

6. The method of claim 5, wherein performing the plane-wave decomposition procedure comprises applying a linear Radon transform to axial motion sensor signals.

7. The method of claim 5, wherein performing the plane-wave decomposition procedure comprises applying a two-dimensional Fourier transform to axial motion sensor signals.

8. The methods of claim 3, wherein determining the forward and backward propagating axial components comprises:
   time-aligning the measurements from the one or more motion sensors based on known positions of the one or more motion sensors within the cable and on known axial vibration propagation velocities in the cable; and
   applying a horizontal low-pass filter to the time-aligned motion sensor measurements.

9. The method of claim 3, wherein determining the forward and backward propagating axial components is performed in a first procedure to determine the forward propagating axial components and in a second procedure to determine the backward propagating components.

10. The method of claim 9, further comprising:
    performing the first and the second procedures iteratively, such that an output from one of the procedures is applied as an input to the other of the procedures during each iteration, until one or more threshold conditions is reached.

11. The method of claim 1:
    wherein the generally longitudinal axis of the cable lies along an X axis of a mutually orthogonal X, Y, Z coordinate system; and
    further comprising determining angles $\theta y$ and $\theta z$, where $\theta y$ specifies a rotation of the accelerometer axes about the Y axis and $\theta z$ specifies a rotation of the accelerometer axes about the Z axis, such that the rotation transformation may be computed as a function of angles $\theta y$ and $\theta z$ and measurements Ax, Ay and Az.

12. The method of claim 11, wherein determining the angles $\theta y$ and $\theta z$ is based at least in part on the measurements Ax, Ay and Az.

13. The method of claim 12, wherein determining the angles $\theta y$ and $\theta z$ comprises performing an optimization procedure that finds the two angles by minimizing a cross correlation between rotated versions of measurements Ax and Ay and a cross correlation between rotated versions of Ax and Az.

14. The method of claim 13, further comprising applying a low-cut filter to measurements Ax, Ay and Az prior to performing the optimization procedure, wherein the low-cut filter is configured to attenuate signals that are due to gravitational acceleration.

15. The method of claim 13, wherein the optimization procedure comprises minimizing a cost function that is a function of angles $\theta y$ and $\theta z$ and measurements Ax, Ay and Az.

16. The method of claim 1, wherein the subtracting comprises applying one or more adaptive subtraction techniques.

17. The method of claim 1, wherein the cable comprises a marine seismic sensor streamer.

18. A tangible, non-transitory, computer-readable medium containing instructions that, when executed by a computer system, cause the computer system to perform a method of generating reduced noise pressure sensor measurements from measurements made by one or more pressure sensors disposed in a cable having a generally longitudinal axis, the method comprising:
   determining estimated axial vibration noise at a location along the cable based at least in part on measurements from one or more motion sensors disposed in the cable; and
   subtracting the estimated axial vibration noise from pressure sensor measurements corresponding to the location, thereby generating the reduced noise pressure measurements;
   wherein the one or more motion sensors comprise at least one three-axis accelerometer that defines mutually orthogonal x, y and z accelerometer axes and that is configured to produce three orthogonal component measurements Ax, Ay and Az corresponding to the x, y, and z mutually orthogonal accelerometer axes, respectively; and
   wherein determining the estimated axial vibration noise comprises determining an axial acceleration component by applying a rotation transformation to the orthogonal component measurements Ax, Ay and Az of the at least one three-axis accelerometer.

19. The medium of claim 18, wherein determining the estimated axial vibration noise comprises:
   determining estimated axial velocity signals at the location; and
   scaling the estimated axial velocity signals.

20. The medium of claim 19, wherein determining the estimated axial velocity signals comprises:
   associating forward and backward directions with the axis of the cable;
   determining forward and backward propagating axial components in motion sensor measurements; and
   summing the forward and backward propagating axial components after phase shifting one of the components by 180 degrees.

21. The medium of claim 20, wherein determining the forward and backward propagating axial components comprises performing a plane-wave decomposition procedure.

22. The medium of claim 21, wherein performing the plane-wave decomposition procedure comprises applying a linear Radon transform to axial motion sensor signals.

23. The medium of claim 21, wherein performing the plane-wave decomposition procedure comprises applying a two-dimensional Fourier transform to axial motion sensor signals.

24. The medium of claim 20, wherein determining the forward and backward propagating axial components comprises:
   time-aligning the measurements from the one or more motion sensors based on known positions of the one or more motion sensors within the cable and on known axial vibration propagation velocities in the cable; and
   applying a horizontal low-pass filter to the time-aligned motion sensor measurements.

25. The medium of claim 18:
   wherein the generally longitudinal axis of the cable lies along an X axis of a mutually orthogonal X, Y, Z coordinate system; and
   further comprising determining angles $\theta y$ and $\theta z$, where $\theta y$ specifies a rotation of the accelerometer axes about the Y axis and $\theta z$ specifies a rotation of the accelerometer axes about the Z axis, such that the rotation transformation may be computed as a function of angles $\theta y$ and $\theta z$ and measurements Ax, Ay and Az.

26. The medium of claim 25, wherein determining the angles $\theta y$ and $\theta z$ is based at least in part on the measurements Ax, Ay and Az.

27. A computer system configured to perform a method of generating reduced noise pressure sensor measurements from measurements made by one or more pressure sensors disposed in a cable having a generally longitudinal axis, the method comprising:
   determining estimated axial vibration noise at a location along the cable based at least in part on measurements from one or more motion sensors disposed in the cable; and
   subtracting the estimated axial vibration noise from pressure sensor measurements corresponding to the location, thereby generating the reduced noise pressure measurements;
   wherein the one or more motion sensors comprise at least one three-axis accelerometer that defines mutually orthogonal x, y and z accelerometer axes and that is configured to produce three orthogonal component measurements Ax, Ay and Az corresponding to the x, y, and z mutually orthogonal accelerometer axes, respectively; and
   wherein determining the estimated axial vibration noise comprises determining an axial acceleration component by applying a rotation transformation to the orthogonal component measurements Ax, Ay and Az of the at least one three-axis accelerometer.

28. The computer system of claim 27, wherein the method further comprises:
   storing the reduced noise pressure sensor measurements in a tangible, non-volatile computer readable medium.

29. The method of claim 1, further comprising:
   storing the reduced noise pressure measurements in a non-transitory computer-readable medium, thereby completing the manufacture of a geophysical data product.

30. The system of claim 27:
   wherein the generally longitudinal axis of the cable lies along an X axis of a mutually orthogonal X, Y, Z coordinate system; and
   further comprising determining angles $\theta y$ and $\theta z$, where $\theta y$ specifies a rotation of the accelerometer axes about the Y axis and $\theta z$ specifies a rotation of the accelerometer axes about the Z axis, such that the rotation transformation may be computed as a function of angles $\theta y$ and $\theta z$ and measurements Ax, Ay and Az.

31. The system of claim 30, wherein:
   determining the angles $\theta y$ and $\theta z$ is based at least in part on the measurements Ax, Ay and Az.

* * * * *